(12) United States Patent
Sheppard et al.

(10) Patent No.: US 10,791,355 B2
(45) Date of Patent: Sep. 29, 2020

(54) METHODS AND APPARATUS TO DETERMINE PROBABILISTIC MEDIA VIEWING METRICS

(71) Applicant: The Nielsen Company (US), LLC, New York, NY (US)

(72) Inventors: Michael Sheppard, Holland, MI (US); Jonathan Sullivan, Hurricane, UT (US); Peter C. Doe, Ridgewood, NJ (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/385,508

(22) Filed: Dec. 20, 2016

(65) Prior Publication Data

US 2018/0176622 A1    Jun. 21, 2018

(51) Int. Cl.
| | | |
|---|---|---|
| *G06K 9/00* | (2006.01) | |
| *G11B 27/10* | (2006.01) | |
| *H04N 21/258* | (2011.01) | |
| *H04N 21/25* | (2011.01) | |
| *G06F 19/20* | (2011.01) | |

(52) U.S. Cl.
CPC ..... *H04N 21/25891* (2013.01); *H04N 21/252* (2013.01); *H04N 21/25883* (2013.01)

(58) Field of Classification Search
None
See application file for complete search history.

(56) References Cited

U.S. PATENT DOCUMENTS

| | | |
|---|---|---|
| 3,540,003 A | 11/1970 | Murphy |
| 3,696,297 A | 10/1972 | Otero |
| 3,818,458 A | 6/1974 | Deese |
| 3,906,454 A | 9/1975 | Martin |

(Continued)

FOREIGN PATENT DOCUMENTS

| | | |
|---|---|---|
| CN | 101980174 | 2/2011 |
| EP | 0228242 | 7/1987 |

(Continued)

OTHER PUBLICATIONS http://onlinestatbook.com/2/probability/basic.html ; Published Nov. 28, 2015; p. 1-2 of filewrapper pdf titled (Nov. 28, 2015 online stat book_probability and wayback machine).*

(Continued)

*Primary Examiner* — Nasser M Goodarzi
*Assistant Examiner* — Terrika Peterson
(74) *Attorney, Agent, or Firm* — Hanley, Flight & Zimmerman, LLC

(57) ABSTRACT

Methods and apparatus to determine probabilistic media viewing metrics are disclosed herein. An example apparatus for determining a viewing metric for media to be viewed by a plurality of panelists includes a probability identifier to identify a probability for respective ones of the panelists with respect to the panelists viewing the media. The probability identifier is to identify the probability based on viewing data for the respective ones of the panelists. The example apparatus includes a calculator to calculate the viewing metric for the media based on the probabilities for the respective ones of the panelists and a sampling weight assigned to the respective ones of the panelists.

19 Claims, 4 Drawing Sheets

(56) References Cited

U.S. PATENT DOCUMENTS

| | | |
|---|---|---|
| 4,058,829 A | 11/1977 | Thompson |
| 4,125,892 A | 11/1978 | Fuduka et al. |
| 4,166,290 A | 2/1979 | Furtman et al. |
| 4,236,209 A | 11/1980 | Lombardo, Jr. et al. |
| 4,258,386 A | 3/1981 | Cheung |
| 4,283,709 A | 8/1981 | Lucero et al. |
| 4,355,372 A | 10/1982 | Johnson et al. |
| 4,356,545 A | 10/1982 | West |
| 4,473,824 A | 9/1984 | Claytor |
| 4,516,216 A | 5/1985 | Armstrong |
| 4,546,382 A | 10/1985 | McKenna et al. |
| 4,566,030 A | 1/1986 | Nickerson et al. |
| 4,602,279 A | 7/1986 | Freeman |
| 4,603,232 A | 7/1986 | Kurland et al. |
| 4,658,290 A | 4/1987 | McKenna et al. |
| 4,677,552 A | 6/1987 | Sibley et al. |
| 4,695,880 A | 9/1987 | Johnson et al. |
| 4,700,378 A | 10/1987 | Brown |
| 4,706,121 A | 11/1987 | Young |
| 4,713,791 A | 12/1987 | Saluski |
| 4,718,025 A | 1/1988 | Minor et al. |
| 4,725,886 A | 2/1988 | Galumbeck et al. |
| 4,740,912 A | 4/1988 | Whitaker |
| 4,745,549 A | 5/1988 | Hashimoto |
| 4,745,559 A | 5/1988 | Willis et al. |
| 4,751,578 A | 6/1988 | Reiter et al. |
| 4,757,456 A | 7/1988 | Benghait |
| 4,774,658 A | 9/1988 | Lewin |
| 4,783,648 A | 11/1988 | Homma et al. |
| 4,792,921 A | 12/1988 | Corwin |
| 4,817,080 A | 3/1989 | Soha |
| 4,823,290 A | 4/1989 | Fasack et al. |
| 4,831,582 A | 5/1989 | Miller et al. |
| 4,845,658 A | 7/1989 | Gifford |
| 4,849,879 A | 7/1989 | Chinnaswamy et al. |
| 4,868,116 A | 9/1989 | Morgan et al. |
| 4,868,866 A | 9/1989 | Williams, Jr. |
| 4,887,308 A | 12/1989 | Dutton |
| 4,907,188 A | 3/1990 | Suzuki |
| 4,912,466 A | 3/1990 | Call |
| 4,912,522 A | 3/1990 | Oates et al. |
| 4,924,488 A | 5/1990 | Kosich |
| 4,930,011 A | 5/1990 | Kiewit |
| 4,935,870 A | 6/1990 | Burk, Jr. et al. |
| 4,954,699 A | 9/1990 | Coffey et al. |
| 4,958,284 A | 9/1990 | Bishop et al. |
| 4,961,132 A | 10/1990 | Uehara |
| 4,972,367 A | 11/1990 | Burke |
| 4,972,504 A | 11/1990 | Daniel, Jr. et al. |
| 4,977,455 A | 12/1990 | Young |
| 4,977,594 A | 12/1990 | Shear |
| 4,989,230 A | 1/1991 | Gillig et al. |
| 5,006,978 A | 4/1991 | Neches |
| 5,007,017 A | 4/1991 | Kobayashi |
| 5,008,929 A | 4/1991 | Olsen et al. |
| 5,019,963 A | 5/1991 | Alderson et al. |
| 5,023,907 A | 6/1991 | Johnson et al. |
| 5,023,929 A | 6/1991 | Call |
| 5,038,211 A | 8/1991 | Hallenbeck |
| 5,038,374 A | 8/1991 | Kaufman et al. |
| 5,042,027 A | 8/1991 | Takase et al. |
| 5,047,867 A | 9/1991 | Strubbe et al. |
| 5,049,873 A | 9/1991 | Robins et al. |
| 5,062,147 A | 10/1991 | Pickett et al. |
| 5,063,610 A | 11/1991 | Alwadish |
| 5,088,108 A | 2/1992 | Uddenfeldt et al. |
| 5,101,402 A | 3/1992 | Chiu et al. |
| 5,109,350 A | 4/1992 | Henwood et al. |
| 5,140,419 A | 8/1992 | Galumbeck et al. |
| 5,148,365 A | 9/1992 | Dembo |
| 5,150,116 A | 9/1992 | West |
| 5,150,414 A | 9/1992 | Ng |
| 5,155,591 A | 10/1992 | Wachob |
| 5,159,685 A | 10/1992 | Kung |
| 5,161,109 A | 11/1992 | Keating et al. |
| 5,166,866 A | 11/1992 | Kim et al. |
| 5,181,113 A | 1/1993 | Chang |
| 5,204,947 A | 4/1993 | Bernstein et al. |
| 5,208,588 A | 5/1993 | Nishiyama |
| 5,210,530 A | 5/1993 | Kammerer et al. |
| 5,212,684 A | 5/1993 | Maenamee et al. |
| 5,214,792 A | 5/1993 | Alwadish |
| 5,220,522 A | 6/1993 | Wilson et al. |
| 5,220,655 A | 6/1993 | Tsutsui |
| 5,223,827 A | 6/1993 | Bell et al. |
| 5,223,924 A | 6/1993 | Strubbe |
| 5,226,120 A | 7/1993 | Brown et al. |
| 5,231,593 A | 7/1993 | Notess |
| 5,235,680 A | 8/1993 | Bijnagte |
| 5,237,677 A | 8/1993 | Hirosawa et al. |
| 5,237,681 A | 8/1993 | Kagan et al. |
| 5,237,684 A | 8/1993 | Record et al. |
| 5,239,540 A | 8/1993 | Rovira et al. |
| 5,241,625 A | 8/1993 | Epard et al. |
| 5,241,671 A | 8/1993 | Reed et al. |
| 5,245,429 A | 9/1993 | Virginio et al. |
| 5,247,517 A | 9/1993 | Ross et al. |
| 5,247,575 A | 9/1993 | Sprague et al. |
| 5,247,697 A | 9/1993 | Ban |
| 5,249,260 A | 9/1993 | Nigawara et al. |
| 5,251,324 A | 10/1993 | McMullan, Jr. |
| 5,253,346 A | 10/1993 | Okabayashi et al. |
| 5,260,878 A | 11/1993 | Luppy |
| 5,262,860 A | 11/1993 | Fitzpatrick et al. |
| 5,267,314 A | 11/1993 | Stambler |
| 5,267,351 A | 11/1993 | Reber et al. |
| 5,276,458 A | 1/1994 | Sawdon |
| 5,276,789 A | 1/1994 | Besaw et al. |
| 5,281,962 A | 1/1994 | Vanden Heuvel et al. |
| 5,283,639 A | 2/1994 | Esch et al. |
| 5,287,363 A | 2/1994 | Wolf et al. |
| 5,297,249 A | 3/1994 | Bernstein et al. |
| 5,299,115 A | 3/1994 | Fields |
| 5,301,350 A | 4/1994 | Rogan et al. |
| 5,309,243 A | 5/1994 | Tsai |
| 5,315,093 A | 5/1994 | Stewart |
| 5,315,580 A | 5/1994 | Phaal |
| 5,317,140 A | 5/1994 | Dunthorn |
| 5,321,831 A | 6/1994 | Hirose |
| 5,321,838 A | 6/1994 | Hensley et al. |
| 5,327,237 A | 7/1994 | Gerdes et al. |
| 5,327,554 A | 7/1994 | Palazzi, III et al. |
| 5,331,544 A | 7/1994 | Lu et al. |
| 5,333,302 A | 7/1994 | Hensley et al. |
| 5,339,239 A | 8/1994 | Manabe et al. |
| 5,339,412 A | 8/1994 | Fueki |
| 5,347,632 A | 9/1994 | Fileppe et al. |
| 5,349,662 A | 9/1994 | Johnson et al. |
| 5,351,278 A | 9/1994 | Koshishiba et al. |
| 5,351,293 A | 9/1994 | Michener et al. |
| 5,355,327 A | 10/1994 | Stent et al. |
| 5,355,484 A | 10/1994 | Record et al. |
| 5,359,367 A | 10/1994 | Stockill |
| 5,361,359 A | 11/1994 | Tajalli et al. |
| 5,367,677 A | 11/1994 | Stanfil |
| 5,371,846 A | 12/1994 | Bates |
| 5,374,951 A | 12/1994 | Welsh |
| 5,375,070 A | 12/1994 | Hershey et al. |
| 5,379,380 A | 1/1995 | Mori et al. |
| 5,382,970 A | 1/1995 | Kiefl |
| 5,388,211 A | 2/1995 | Hornbuckle |
| 5,388,252 A | 2/1995 | Dreste et al. |
| 5,388,258 A | 2/1995 | Larsson et al. |
| 5,390,281 A | 2/1995 | Luciw et al. |
| 5,398,336 A | 3/1995 | Tantry et al. |
| 5,406,569 A | 4/1995 | Baran |
| 5,408,607 A | 4/1995 | Nishikawa et al. |
| 5,410,598 A | 4/1995 | Shear |
| 5,412,778 A | 5/1995 | Andres |
| 5,414,809 A | 5/1995 | Hogan et al. |
| 5,418,728 A | 5/1995 | Yada |
| 5,461,708 A | 10/1995 | Kahn |
| 5,481,294 A | 1/1996 | Thomas et al. |
| 5,483,658 A | 1/1996 | Grube et al. |

(56) References Cited

U.S. PATENT DOCUMENTS

| | | |
|---|---|---|
| 5,485,897 A | 1/1996 | Matsumoto et al. |
| 5,491,820 A | 2/1996 | Belove et al. |
| 5,495,282 A | 2/1996 | Mostafa et al. |
| 5,495,581 A | 2/1996 | Tsai |
| 5,499,340 A | 3/1996 | Barritz |
| 5,524,073 A | 6/1996 | Stambler |
| 5,550,928 A * | 8/1996 | Lu .................. G06K 9/00221 382/103 |
| 5,555,303 A | 9/1996 | Stambler |
| 5,557,333 A | 9/1996 | Jungo et al. |
| 5,560,038 A | 9/1996 | Haddock |
| 5,568,471 A | 10/1996 | Hershey et al. |
| 5,572,643 A | 11/1996 | Judson |
| 5,594,911 A | 1/1997 | Cruz et al. |
| 5,594,934 A | 1/1997 | Lu et al. |
| 5,600,364 A | 2/1997 | Hendricks et al. |
| 5,604,867 A | 2/1997 | Harwood |
| 5,608,445 A | 3/1997 | Mischler |
| 5,615,264 A | 3/1997 | Kamzmierczak et al. |
| 5,623,652 A | 4/1997 | Vora et al. |
| 5,634,100 A | 5/1997 | Capps |
| 5,646,998 A | 7/1997 | Stambler |
| 5,648,965 A | 7/1997 | Thadani et al. |
| 5,671,283 A | 9/1997 | Michener et al. |
| 5,673,382 A | 9/1997 | Cannon et al. |
| 5,696,702 A | 12/1997 | Skinner et al. |
| 5,706,502 A | 1/1998 | Foley et al. |
| 5,708,709 A | 1/1998 | Rose |
| 5,708,780 A | 1/1998 | Levergood et al. |
| 5,710,915 A | 1/1998 | McElhiney |
| 5,710,918 A | 1/1998 | Lagarde et al. |
| 5,712,979 A | 1/1998 | Graber et al. |
| 5,715,453 A | 2/1998 | Stewart |
| 5,717,860 A | 2/1998 | Graber et al. |
| 5,717,923 A | 2/1998 | Dedrick |
| 5,724,521 A | 3/1998 | Dedrick |
| 5,732,218 A | 3/1998 | Bland et al. |
| 5,737,619 A | 4/1998 | Judson |
| 5,740,549 A | 4/1998 | Reilley et al. |
| 5,781,893 A | 7/1998 | Felthauser |
| 5,787,253 A | 7/1998 | McCreery et al. |
| 5,793,302 A | 8/1998 | Stambler |
| 5,796,952 A | 8/1998 | Davis et al. |
| 5,799,292 A | 8/1998 | Hekmatpour |
| 5,801,747 A | 9/1998 | Bedard |
| 5,819,156 A | 10/1998 | Belmont |
| 5,819,285 A | 10/1998 | Damico et al. |
| 5,823,879 A | 10/1998 | Goldberg et al. |
| 5,829,001 A | 10/1998 | Li et al. |
| 5,835,923 A | 11/1998 | Shibata et al. |
| 5,838,919 A | 11/1998 | Schwaller et al. |
| 5,841,433 A | 11/1998 | Chaney |
| 5,848,396 A | 12/1998 | Gerace |
| 5,857,190 A | 1/1999 | Brown |
| 5,870,546 A | 2/1999 | Kirsch |
| 5,872,588 A | 2/1999 | Aras et al. |
| 5,878,224 A | 3/1999 | Smith |
| 5,878,384 A | 3/1999 | Johnson et al. |
| 5,881,360 A | 3/1999 | Fong |
| 5,892,917 A | 4/1999 | Myerson |
| 5,926,168 A | 7/1999 | Fan |
| 5,931,912 A | 8/1999 | Wu et al. |
| 5,933,811 A | 8/1999 | Angles et al. |
| 5,935,207 A | 8/1999 | Logue et al. |
| 5,936,541 A | 8/1999 | Stambler |
| 5,948,061 A | 9/1999 | Merriman et al. |
| 5,951,643 A | 9/1999 | Shelton et al. |
| 5,956,483 A | 9/1999 | Grate et al. |
| 5,958,010 A | 9/1999 | Agarwal et al. |
| 5,963,914 A | 10/1999 | Skinner et al. |
| 5,964,839 A | 10/1999 | Johnson et al. |
| 5,974,148 A | 10/1999 | Stambler |
| 5,974,299 A | 10/1999 | Massetti |
| 5,977,964 A | 11/1999 | Williams et al. |
| 5,982,917 A | 11/1999 | Clarke et al. |
| 5,986,653 A | 11/1999 | Phathayakorn et al. |
| 5,991,735 A | 11/1999 | Gerace |
| 5,999,178 A | 12/1999 | Hwang et al. |
| 6,005,597 A | 12/1999 | Barrett et al. |
| 6,006,260 A | 12/1999 | Barrick, Jr. et al. |
| 6,014,638 A | 1/2000 | Burge et al. |
| 6,018,619 A | 1/2000 | Allard et al. |
| 6,049,695 A | 4/2000 | Cottam |
| 6,052,730 A | 4/2000 | Felciano et al. |
| 6,067,440 A | 5/2000 | Diefes |
| 6,070,145 A | 5/2000 | Pinsley et al. |
| 6,078,324 A | 6/2000 | Phathayakorn et al. |
| 6,108,637 A | 8/2000 | Blumenau |
| 6,112,238 A | 8/2000 | Boyd et al. |
| 6,112,240 A | 8/2000 | Pogue et al. |
| 6,115,608 A | 9/2000 | Duran et al. |
| 6,115,742 A | 9/2000 | Franklin et al. |
| 6,119,098 A | 9/2000 | Guyot et al. |
| 6,138,155 A | 10/2000 | Davis et al. |
| 6,167,358 A | 12/2000 | Othmer et al. |
| 6,173,311 B1 | 1/2001 | Hassett et al. |
| 6,185,586 B1 | 2/2001 | Judson |
| 6,216,129 B1 | 4/2001 | Eldering |
| 6,219,786 B1 | 4/2001 | Cunningham et al. |
| 6,226,677 B1 | 5/2001 | Slemmer |
| 6,237,033 B1 | 5/2001 | Doeberl et al. |
| 6,250,930 B1 | 6/2001 | Mintz |
| 6,256,739 B1 | 7/2001 | Skopp et al. |
| 6,264,560 B1 | 7/2001 | Goldberg et al. |
| 6,275,854 B1 | 8/2001 | Himmel et al. |
| 6,278,966 B1 | 8/2001 | Howard et al. |
| 6,279,036 B1 | 8/2001 | Himmel et al. |
| 6,279,112 B1 | 8/2001 | O'Toole, Jr. et al. |
| 6,286,036 B1 | 9/2001 | Rhoads |
| 6,298,348 B1 | 10/2001 | Eldering |
| 6,317,787 B1 | 11/2001 | Boyd et al. |
| 6,324,546 B1 | 11/2001 | Ka et al. |
| 6,360,261 B1 | 3/2002 | Boyd et al. |
| 6,381,632 B1 | 4/2002 | Lowell |
| 6,393,479 B1 | 5/2002 | Glommen et al. |
| 6,397,359 B1 | 5/2002 | Chandra et al. |
| 6,408,335 B1 | 6/2002 | Schwaller et al. |
| 6,418,470 B2 | 7/2002 | Blumenau |
| 6,434,532 B2 | 8/2002 | Goldband et al. |
| 6,446,261 B1 | 9/2002 | Rosser |
| 6,449,604 B1 | 9/2002 | Hansen et al. |
| 6,457,025 B2 | 9/2002 | Judson |
| 6,466,970 B1 | 10/2002 | Lee et al. |
| 6,473,407 B1 | 10/2002 | Ditmer et al. |
| 6,483,813 B1 | 11/2002 | Blencowe |
| 6,484,316 B1 | 11/2002 | Lindberg |
| 6,569,095 B2 | 5/2003 | Eggers |
| 6,601,100 B2 | 7/2003 | Lee et al. |
| 6,606,745 B2 | 8/2003 | Maggio |
| 6,609,239 B1 | 8/2003 | Xavier |
| 6,621,881 B2 | 9/2003 | Srinivasan |
| 6,625,648 B1 | 9/2003 | Schwaller et al. |
| 6,662,195 B1 | 12/2003 | Langseth et al. |
| 6,662,227 B2 | 12/2003 | Boyd et al. |
| 6,671,715 B1 | 12/2003 | Langseth et al. |
| 6,712,702 B2 | 3/2004 | Goldberg et al. |
| 6,719,660 B2 | 4/2004 | Palazzolo |
| 6,735,775 B1 | 5/2004 | Massetti |
| 6,766,370 B2 | 7/2004 | Glommen et al. |
| 6,807,558 B1 | 10/2004 | Hassett et al. |
| 6,842,782 B1 | 1/2005 | Malik et al. |
| 6,859,833 B2 | 2/2005 | Kirsch et al. |
| 6,993,590 B1 | 1/2006 | Gaulthier et al. |
| 7,017,143 B1 | 3/2006 | Andrew et al. |
| 7,117,518 B1 | 10/2006 | Takahashi et al. |
| 7,139,723 B2 | 11/2006 | Conkwright et al. |
| 7,146,329 B2 | 12/2006 | Conkwright et al. |
| 7,150,030 B1 | 12/2006 | Eldering et al. |
| 7,181,412 B1 | 2/2007 | Fulgoni et al. |
| 7,216,149 B1 | 5/2007 | Briscoe et al. |
| 7,222,071 B2 | 5/2007 | Neuhauser et al. |
| 7,236,941 B2 | 6/2007 | Conkwright et al. |
| 7,260,823 B2 | 8/2007 | Schlack et al. |
| 7,260,837 B2 | 8/2007 | Abraham et al. |

(56) References Cited

U.S. PATENT DOCUMENTS

| | | |
|---|---|---|
| 7,343,616 B1 | 3/2008 | Takahashi et al. |
| 7,376,722 B1 | 5/2008 | Or Sim et al. |
| 7,451,151 B2 | 11/2008 | Horvitz et al. |
| 7,483,835 B2 | 1/2009 | Neuhauser et al. |
| 7,493,655 B2 | 2/2009 | Brown |
| 7,757,250 B1 | 7/2010 | Horvitz et al. |
| 7,827,227 B2 | 11/2010 | Iijima et al. |
| 7,953,791 B2 | 5/2011 | Or Ssim et al. |
| 7,953,839 B2 | 5/2011 | Or Sim et al. |
| 7,962,935 B2 | 6/2011 | Kurosaki et al. |
| 8,046,797 B2 | 10/2011 | Bentolila et al. |
| 8,112,511 B2 | 2/2012 | Or Sim et al. |
| 8,311,888 B2 | 11/2012 | Ramer et al. |
| 8,484,677 B1 | 7/2013 | Eldering |
| 8,510,770 B1 | 8/2013 | Oztaskent et al. |
| 8,514,907 B2 | 8/2013 | Wright et al. |
| 8,531,606 B2 | 9/2013 | Pyo |
| 8,739,197 B1 | 5/2014 | Pecjak et al. |
| 8,898,689 B2 | 11/2014 | Georgakis |
| 8,930,989 B2 | 1/2015 | Knoller et al. |
| 8,984,547 B2 | 3/2015 | Lambert et al. |
| 9,185,435 B2 | 11/2015 | Shankar et al. |
| 9,219,928 B2 | 12/2015 | Shankar et al. |
| 9,247,273 B2 | 1/2016 | Shankar et al. |
| 9,277,265 B2 | 3/2016 | Wood et al. |
| 9,544,632 B2 | 1/2017 | Wood et al. |
| 9,578,357 B2 | 2/2017 | Wolf et al. |
| 9,743,141 B2 | 8/2017 | Sheppard et al. |
| 9,774,900 B2 | 9/2017 | Wood et al. |
| 10,219,039 B2 | 2/2019 | Mowrer et al. |
| 2001/0049620 A1 | 12/2001 | Blasko |
| 2002/0040394 A1 | 4/2002 | Shapira |
| 2002/0040395 A1 | 4/2002 | Davis et al. |
| 2002/0049762 A1 | 4/2002 | Shah et al. |
| 2002/0056087 A1 | 5/2002 | Berezowski et al. |
| 2002/0072966 A1 | 6/2002 | Eldering et al. |
| 2002/0077787 A1 | 6/2002 | Rappaport et al. |
| 2002/0078191 A1 | 6/2002 | Lorenz |
| 2002/0099812 A1 | 7/2002 | Davis et al. |
| 2002/0099818 A1 | 7/2002 | Russell et al. |
| 2002/0099819 A1 | 7/2002 | Hattori et al. |
| 2002/0103664 A1 | 8/2002 | Olsson et al. |
| 2002/0112048 A1 | 8/2002 | Gruyer et al. |
| 2002/0124074 A1 | 9/2002 | Levy et al. |
| 2002/0150054 A1 | 10/2002 | Sohraby et al. |
| 2002/0161673 A1 | 10/2002 | Lee et al. |
| 2003/0018969 A1 | 1/2003 | Humpleman et al. |
| 2003/0046303 A1 | 3/2003 | Chen et al. |
| 2003/0046385 A1 | 3/2003 | Vincent |
| 2003/0062223 A1 | 4/2003 | Coyle et al. |
| 2003/0067554 A1* | 4/2003 | Klarfeld ............... G11B 27/105 |
| | | 348/461 |
| 2003/0110485 A1 | 6/2003 | Lu et al. |
| 2003/0144868 A1 | 7/2003 | MacIntyre et al. |
| 2003/0145319 A1 | 7/2003 | Sato |
| 2003/0149975 A1 | 8/2003 | Eldering et al. |
| 2003/0163563 A1 | 8/2003 | Bean |
| 2003/0182387 A1 | 9/2003 | Geshwind |
| 2003/0187677 A1 | 10/2003 | Malireddy et al. |
| 2003/0208578 A1 | 11/2003 | Taraborelli |
| 2003/0231203 A1 | 12/2003 | Gallella |
| 2003/0233197 A1* | 12/2003 | Padilla ................... G06F 19/20 |
| | | 702/20 |
| 2004/0003391 A1 | 1/2004 | Gutta et al. |
| 2004/0024717 A1 | 2/2004 | Sneeringer |
| 2004/0221033 A1 | 11/2004 | Davis et al. |
| 2005/0114511 A1 | 5/2005 | Davis et al. |
| 2005/0149964 A1 | 7/2005 | Thomas et al. |
| 2006/0074769 A1 | 4/2006 | Looney et al. |
| 2006/0075421 A1 | 4/2006 | Roberts et al. |
| 2006/0136965 A1 | 6/2006 | Ellis et al. |
| 2007/0011039 A1 | 1/2007 | Oddo |
| 2007/0022032 A1 | 1/2007 | Anderson et al. |
| 2007/0136753 A1 | 6/2007 | Bovenschulte et al. |
| 2007/0143778 A1 | 6/2007 | Covell et al. |
| 2007/0174295 A1 | 7/2007 | Abraham et al. |
| 2007/0276940 A1 | 11/2007 | Abraham et al. |
| 2007/0294729 A1 | 12/2007 | Ramaswamy |
| 2007/0294740 A1 | 12/2007 | Drake et al. |
| 2008/0077951 A1 | 3/2008 | Maggio et al. |
| 2008/0120650 A1 | 5/2008 | Orihara et al. |
| 2008/0140479 A1 | 6/2008 | Mello et al. |
| 2008/0256235 A1 | 10/2008 | Or Sim et al. |
| 2008/0263200 A1 | 10/2008 | Or Sim et al. |
| 2008/0300965 A1 | 12/2008 | Doe |
| 2009/0055854 A1 | 2/2009 | Wright et al. |
| 2009/0112703 A1 | 4/2009 | Brown |
| 2009/0147786 A1 | 6/2009 | Li et al. |
| 2010/0114527 A1* | 5/2010 | Lee ..................... H04H 60/32 |
| | | 702/181 |
| 2010/0146533 A1 | 6/2010 | Matsunaga et al. |
| 2010/0205628 A1 | 8/2010 | Davis et al. |
| 2010/0228855 A1 | 9/2010 | Sim et al. |
| 2011/0004682 A1 | 1/2011 | Honnold et al. |
| 2011/0029636 A1 | 2/2011 | Smyth et al. |
| 2011/0208860 A1 | 8/2011 | Or Sim et al. |
| 2011/0258049 A1 | 10/2011 | Ramer et al. |
| 2012/0124620 A1 | 5/2012 | Nishizawa et al. |
| 2012/0254911 A1 | 10/2012 | Doe |
| 2012/0260278 A1 | 10/2012 | Lambert et al. |
| 2013/0160042 A1 | 6/2013 | Stokes et al. |
| 2013/0163658 A1 | 6/2013 | Luff et al. |
| 2013/0179914 A1 | 7/2013 | Falcon |
| 2013/0227595 A1 | 8/2013 | Nielsen et al. |
| 2014/0150003 A1 | 5/2014 | Doe |
| 2014/0379421 A1 | 12/2014 | Shankar et al. |
| 2014/0380348 A1 | 12/2014 | Shankar et al. |
| 2014/0380350 A1* | 12/2014 | Shankar ............ G06Q 30/0204 |
| | | 725/18 |
| 2015/0067075 A1 | 3/2015 | Sheppard et al. |
| 2015/0189378 A1 | 7/2015 | Soundararajan et al. |
| 2015/0229979 A1 | 8/2015 | Wood et al. |
| 2016/0037201 A1* | 2/2016 | Kitts ................. H04N 21/2668 |
| | | 725/35 |
| 2016/0092267 A1* | 3/2016 | Boyacigiller ...... G06Q 10/0633 |
| | | 718/103 |
| 2016/0165277 A1* | 6/2016 | Kirillov ............... H04N 21/251 |
| | | 725/14 |
| 2016/0165287 A1 | 6/2016 | Wood et al. |
| 2016/0269783 A1 | 9/2016 | Mowrer et al. |
| 2017/0078727 A1 | 3/2017 | Wood et al. |
| 2017/0083580 A1* | 3/2017 | Sheppard ......... G06F 17/30489 |
| 2018/0005128 A1 | 1/2018 | Sheppard et al. |

FOREIGN PATENT DOCUMENTS

| | | |
|---|---|---|
| EP | 0388658 | 9/1990 |
| EP | 0451384 | 10/1991 |
| EP | 0632382 | 1/1995 |
| EP | 0747841 | 12/1996 |
| JP | 2004357311 | 12/2004 |
| JP | 20080011365 | 1/2008 |
| KR | 20130008978 | 1/2013 |
| WO | 9826529 | 6/1998 |
| WO | 0111606 | 2/2001 |
| WO | 2006096177 | 9/2006 |
| WO | 2007022250 | 2/2007 |

OTHER PUBLICATIONS

Maximum Likelihood from Incomplete Data via the EM Algorithm A. P. Dempster; N. M. Laird; D. B. Rubin Journal of the Royal Statistical Society. Series B (Methodological), vol. 39, No. 1. (1977), pp. 1-38. http://links.jstor.org/sici?sici=0035-9246%281977%2939%3A1%3C1%3AMLFIDV%3E2.0.CO%3B2-Z.* http://onlinestatbook.com/2/probability/basic.htnnl ; captured via The Wayback Machine Jul. 16, 2014 (Year: 2014).*

Screen Shot of ftp.ist.utl.pt, 1999 (3 pages).

Pestana et al., "A Visual History of Web Measurement: Vendor Emergence, Technology Deployment and Seminal Events," 2005 (1 page).

(56) References Cited

OTHER PUBLICATIONS

"Third International World-Wide Web Conference-Technology, Tools and Applications," Apr. 10-14, 1995, retrieved from <http://www.igd.fhg.de/archive/1995_www95/>, retrieved on May 24, 2006 (1 page).
Sanders, "Plexus Log File Summaries," email message from sanders@bsdi.com, Jun. 18, 1993, retrieved from <http://ksi.cpsc.ucalgary.ca/archives/WWW-TALK/www-talk-1993q2.messages/563.html> retrieved from May 24, 2006 (4 pages).
"2.4—Windows Based Only Internet BBS Software—The Official BBS FAQ," retrieved from <http://www.sysopworld.com/bbsfaq/ch02.2.4.htm>, retrieved on May 24, 2006 (23 pages).
java@mte-technik.uni-kassel.de, "Counter," retrieved from <http://we.archive.org/web/19970802020140/www.uni-kassel.de/fb16/ipm/mt/java/counteru.html>, retrieved on May 24, 2006 (1 page).
"Linear IP Advertising Infrastructure," retrieved from <http://blackarrow.tv/wp-content/uploads/2015/04/Linear-IP-Advertising_Infrastructure_CED-Wallchart.jpg>, retrieved on Dec. 9, 2015 (1 page).
"Web Authoring FAQ," 2005 (59 pages).
wwwTalk 1991 Archives, "Messages from Monday Oct. 28, 1991 to Friday, Dec. 13, 1991," retrieved from <http://ksi.cpsc.ucalgary.ca/archives/www-talk/www-talk-1991.index.html>, retrieved on May 24, 2006 (1 page).
Applet Demos, 1995-1996 (2 pages).
Wendt, "Applet Collection," retrieved from <http://www.thew.de/t/collection/readme.html>, retrieved on Dec. 9, 2015 (5 pages).
Applets At Kassel, "Applets and Applications," Department of Engineering Measurement, Aug. 27, 1996, retrieved from <http://web.archive.org/ web/19970802020436/http://www..uni-kassel.de/fb16Iipm/mUjavae/html>, retrieved on May 24, 2006 (5 pages).
Arbitron Inc., "Smartplus 8.0: Keeps Getting Smarter So You Can Too," 2007 (13 pages).
Arbitron Inc., "Respondent-Level Data: Your Key to Reaching the Hispanic Listener," retrieved from <http://arbitronratings.com/ad_agencies/rld_vs_hispsumm.htm?inframe>, retrieved on Sep. 21, 2007 (1 page).
Abrams et al., "Multimedia Traffic Analysis Using CHITRA95," ACM Multimedia 95-Electronic Proceedings, Nov. 5-9 1995, retrieved from <http://ei.cs.vt.edu/~succeed/95multimediaAWAFPR/95multimediaAWAFPR.html>, retrieved on Jun. 9, 2006 (17 pages).
Abrams, "A Tool to Aid in Model Development and Validation," NCR Corporation, Annual Simulation Symposium, 1986 (10 pages).
Anderson et al., "Next Generation Intrusion Detection Expert System (NIDES)—Software Users Manual Beta—Update Release," SRI International, Dec. 1, 1994 (316 pages).
Arlitt et al., "Internet Web Servers: Workload Characterization and Performance Implications," IEEE/ACM Transactions on Networking, vol. 5, No. 5, Oct. 1997 (15 pages).
Bank, "Java Security," MIT, Dec. 8, 1995, retrieved from <http://groups.csail.mit.edu/mac/users/jbank/javapaper/javapaper.html,> retrieved on Apr. 30, 2015 (11 pages).
Barber, e-mail dated May 3, 1996, (2 pages).
Baskaran, "Gamelan Who's Who More Info," Earth Web, Inc., 1996 (2 pages).
Becker, "Department of Engineering Measurement," UNI Kassel, Sep. 20, 1997 (1 page).
Beckett, "Combined Log System," Computing Laboratory, University of Kent, retrieved from <http://www.igd.fhg.de/archive/1995_www95/papers/46/comblog.html>, retrieved on May 24, 2006 (8 pages).
Bates, "The Design of Browsing and Berrypicking Techniques for the Online Search Interface," Graduate School of Library and Information Science, University of California at Los Angeles, 1989, retrieved from <file://P:\Drive Files\CLIENTS\Nielsen-NetRatings\SettledCases\Sane Solutions LLC\>, retrieved on Dec. 21, 2006 (19 pages).
Berners-Lee et al., "Uniform Resource Locators" Network Working Group, Dec. 1994 (23 pages).

Berners-Lee et al., "WorldWideWeb: Proposal for a HyperText Project," Nov. 12, 1990 (7 pages).
Berners-Lee, "Information Management: A Proposal," CERN, Mar. 1989, May 1990, retrieved from <http://www.w3org/History/1989/proposal.html>, retrieved on May 24, 2006 (14 pages).
Berners-Lee, "Presentation of WWW to Online Publishing 93," retrieved from <http://www.w3org/Talks/OnlinePublishing93/Overview.html>, retrieved on May 24, 2006 (1 pages).
Berners-Lee et al., "Hypertext Transfer Protocol—HTTP/1.0," Network Working Group, May 1996, retrieved from <http://www.3.org/Protocols/rfc1945/rfc1945>, retrieved on Mar. 22, 2007 (57 pages).
Berners-Lee, "The World Wide Web Browser," retrieved from <http://www.w3.org/People/Berners-Lee/WorldWideWeb.html>, retrieved on May 24, 2006 (4 pages).
Bernstein et al., "Architectures for Volatile Hypertext," Hypertext '91 Proceedings, Dec. 1991 (18 pages).
Bertot et al., "Web Usage Statistics: Measurement Issues and Analytical Techniques," Government Information Quarterly, vol. 14, No. 4, 1997 (23 pages).
Bestavros et al., "Application-Level Document Caching in the Internet," Proceeding of the Second International Workshop on Services in Distributed and Networked Environments (SDNE '95), Jun. 5-6, 1995 (8 pages).
Bieber et al., "Backtracking in a Multiple-window Hypertext Environment," ECHT '94 Proceedings, Sep. 1994 (9 pages).
Berners-Lee, "Plenary Talk at WWW Geneva 94," retrieved from <http://www.w3.org/Talks/WWW94Tim/> retrieved on May 24, 2006 (4 pages).
Bl et al., "W3 Project—Assorted Design Notes," W3.org, retrieved from <http://w3.org/History/1994/WWW/WorkingNotes/Overview.html>, retrieved on May 24, 2006 (2 pages).
Blackarrow, Inc., "Meeting the Challenges of Video Advertising in an IP ABR Environment," 2012 (10 pages).
Blythe et al., "Lynx Users Guide Version 2.3," retrieved from <http://www.cse.unsw.edu.au/help/doc/lynx/lynx_help/Lynx_usersguide.html>, retrieved on Jun. 12, 2006 (12 pages).
Boyan, "Anonymous Surfing, The Anonymizer Homepage," Anonymizer, Sep. 1, 1995, retrieved from <http://web.archive.org/web/19990208003332m/_1/anonymizer.cs.cmu.edu:8080/>, retrieved on May 24, 2006 (1 page).
Boyns, "Crazy Counter," modified Mar. 8, 1996 (2 pages).
Boyns, "Crazy Counter (GIF89a)," modified Mar. 8, 1996 (1 page).
Boyns, "CrazyCounter.java," 1996 (5 pages).
Braun et al., "Applied Network Research: 1994 Annual Status Report," Applied Network Research, San Diego Supercomputer Center and University of California, San Diego, Apr. 19, 1995 (15 pages).
Brueggeman, "Monitoring CDROM Usage," UCSD Scripps Institution of Oceanography Library, retrieved from <http://www.peterbrueggeman.com/cv/usage.txt>, retrieved on Oct. 1, 2015 (5 pages).
Carmel et al., "Browsing in Hypertext: A Cognitive Study," IEEE Transactions on Systems, Man, and Cybernetics, vol. 22, No. 5, Sep./Oct. 1992 (23 pages).
Catledge et al., "Characterizing Browsing Strategies in the World-Wide Web," Proceedings of the Third International World-Wide Web Conference on Technology, Tools and Applications, Apr. 1995 (9 pages).
Cern, "Computer News Letter Oct.-Dec. 1991," Ref. CERN-CNL-1991-204, vol. 26, Issue No. 3, retrieved from <http://ref.web.cern.ch/ref/CERN/CNL/1991/204>, retrieved on May 24, 2006 (2 pages).
Chankhunthod et al., "A Hierarchical Internet Object Cache," ATEC' 96 Proceedings of the 1996 Annual Conference on USENIX Annual Technical Conference, 1996 (11 pages).
Chen, "Supporting Advertisement on Electronic Publications,"IBM Technical Disclosure Bulletin, Aug. 1996 (2 pages).
Claffy et al., "Traffic Characteristics of the T1 NSFNET Backbone," INFOCOM '93 Proceedings, Twelfth Annual Joint Conference of the IEEE Computer and Communications Societies, Networking: Foundation for the Future, IEEE, 1993 (11 pages).

(56) References Cited

OTHER PUBLICATIONS

Cooley et al., "Data Preparation for Mining World Wide Web Browsing Patterns," Knowledge and Information Systems, vol. 1, 1999 (27 pages).
Cooley et al., "Web Mining: Information and Pattern Discovery on the World Wide Web," Department of Computer Science, University of Minnesota, Jul. 16, 1997 (2 pages).
Cooper, "Design Considerations in Instrumenting and Monitoring Web-Based Information Retrieval Systems," Journal of the American Society for Information Science, vol. 49, No. 10, 1998 (17 pages).
Cove et al., "Online Text Retrieval via Browsing," Information Processing and Management, vol. 24, No. 1, 1988 (10 pages).
Crovella et al., "Explaining World Wide Web Traffic Self-Similarity," Computer Science Department, Boston University, Technical Report TR-95-15, Oct. 12, 1995 (19 pages).
Crovella et al., "Self-Similarity in World Wide Web Traffic: Evidence and Possible Causes," IEEE/ACM Transactions on Networking, vol. 5, No. 6, Dec. 1997 (25 pages).
Cunha et al., "Characteristics of WWW Client-Based Traces," Computer Science Department, Boston University, Jul. 18, 1995 (19 pages).
Davis et al., "Instant Java Applets," Macmillan Computer Publishing USA, 1996 (234 pages).
Dean et al. (1995) "Security Flaws in the HotJava Web Browser," Proceedings 1996 IEEE Symposium on Security and Privacy, 1996 (8 pages).
December et al., "HTML and CGI Unleashed," 1995 (321 pages). (Uploaded in 5 parts).
Dellecave Jr., "The Net Effect," Sales & Marketing Management: An Excutive's Guide to Sales and Marketing Technology, Mar. 1996 (9 pages).
Desjardins, "Activity Monitor 1.1 User's Guide" (5 pages).
Digital Envoy, "NetAcuity IP Intelligence Whitepaper," Digital Envoy, Inc., 2002-2003 (10 pages).
Email Counter Logs, 1996 (33 pages).
Earth Station 9, "Computers and the Internet," <http://www.earthstation9.com/counters.htm>, retrieved from May 24, 2006 (2 pages).
Earthweb, Inc., "Java-Enhanced Communication Tools," Gamelan, The Official Directory for Java, 1996 (7 pages).
Engagement Marketing Group, "Advanced Advertising Media Project—Phase One: Summary Report—Remaking Video-on-Demand to Deliver Media Value," May 11, 2011 (50 pages).
European Patent Office, "Supplementary Search Report," issued in connection with European Patent Application No. 00949006.1, dated Jul. 12, 2006 (5 pages).
European Patent Office, "Extended Search Report," issued in connection with European Patent Application No. 10012280.3, dated Mar. 17, 2014 (6 pages).
European Patent Office, "Supplementary Partial Search Report," issued in connection with European Patent Application No. 00949006.1, dated Apr. 19, 2006 (4 pages).
European Patent Office, "Office Action," issued in connection with European Patent Application No. 00949006.1, dated Apr. 18, 2008 (7 pages).
European Patent Office, "Office Action," issued in connection with European Patent Application No. 00949006.1, dated Oct. 7, 2014 (6 pages).
Feliciano et al., "Lamprey: Tracking Users on the World Wide Web," Section on Medical Informatics, Stanford University, 1996 (5 pages).
Fielding, "wwwstat manual," retrieved from <http://ftp.ics.uci.edu/pub/websoft/wwwstat/wwwstat.html>, retrieved on Jun. 12, 2006 (11 pages).
Fielding, "wwwstat: HTTPd Logfile Analysis Software," Department of Information and Computer Science, University of California, Irvine, retrieved from <http://ftp.ics.uci.edu/pub/websoft/wwwstat/>, retrieved on May 24, 2006 (3 pages).
Finke, "Monitoring Usage of Workstations with a Relational Database," 1994 LISA—San Diego, California, Sep. 19-23, 1994 (10 pages).
Fleishman, "Web Log Analysis: Who's Doing What, When? Part 2," retrieved from <http://www.webdeveloper.com/management/management_log_analysis_2.html> retrieved on Dec. 21, 2006 (4 pages).
Fuller, "Measuring User Motivation From Server Log Files," Usability Research, retrieved from <http://www.microsoft.com/usability/webconf/fuller/fuller.htm>, Oct. 30, 2000 (15 pages).
Gellman, "They Could be Monitoring Your Every Move," GCN, retrieved from <http:www.gcn.com/print/15 9/31672-1.html>, retrieved on Apr. 20, 2006 (3 pages).
Girdley et al., "Web Programming with Java," 1996 (pp. 365-370).
Girdley et al., "Web Programming with Java," 1996 (481 pages). (Uploaded in 2 parts).
Gile, "Reporting Application Usage in a LAN Environment," ACM SIGUCCS, vol. 18, 1990 (13 pages).
Gilula et al., "A Direct Approach to Data Fusion," journal of Marketing Research, vol. 43, Feb. 2006 (22 pages).
Goldmail, "GoldMail Thinks Consumers Should Get PAID for Reading Advertising!" Google Groups, Jul. 7, 1996 (4 pages).
Goldmail, "GoldMail Revolutionizes Internet Advertising!" Google Groups, Jul. 7, 1996 (4 pages).
Glassman, "A Caching Relay for the World Wide Web," Systems Research Center, Digital Euipment Corporation, 1994 (10 pages).
Google Groups, "java project" "I am volunteering my time," retrieved from <http://groups.google.com/group/comp.lang.java.programmer/browse_thread/thread/5430a3 . . . >, retrieved on Apr. 12, 2006 (3 pages).
Google Groups, "xferstats," retrieved from <http://groups.google.com/group/alt.sources/browse_thread/thread/c9360d434be3ad86/0a180fb213f27e2b?q=xferstats&mum=199&h1=en>, retrieved on May 24, 2006 (6 pages).
Google Groups, "Counter," retrieved from <http://groups-beta.google.com/group/comp.lang.javascript/browse_thread/thread/4874a9f9c . . . >, retrieved on Jun. 8, 2005 (10 pages).
Google Groups, "Can U Make a Hit Counter in a Java Applet?," retrieved from <http://groups.google.com/group/comp.lang.java/browse_thread/thread/f2a41d0cb5c8eee4/c8 . . . >, retrieved on May 2, 2006 (10 pages).
Google Groups, "xferstats," retrieved from <http://groups.google.com/group/comp.unix.xenix/browse_thread/thread/cb3d1aed21bc0e3e/8d9ce54693af9e98?q=xferstats&mum=200 . . . >, retrieved on May 24, 2006 (3 pages).
Google Groups, "wwwstat," retrieved from <http://groups.google.com/group/comp.infosystems.www/browse_thread/thread/784aa9c20470d342/fc0cde0742990875?q=wwwstat&mum=43 . . . >, retrieved on May 24, 2006 (8 pages).
Google Groups, "fwgstat," retrieved from <http://groups.google.com/group/comp.infosystems.gopher/browse_thread/thread/c15dc16c0284c02d0/953bf38f2cee15ea?q=fwgstat&mum=34>, retrieved on May 24, 2006 (3 pages).
Google Groups, "fwgstat," retrieved from <http://groups.google.com/group/comp.infosystems.gopher/browse_thread/thread/4790232128a9157/d1534978ddddf998?q=fwgstat&mum=33>, retrieved on May 24, 2006 (10 pages).
Google Groups, "getsites," retrieved from <http://groups.google.com/group/comp.infosystems.www/browse_thread/threada36eeb6daea735d8/0fa7adf53e51b894?q=getsites&mum=19 & h . . . >, retrieved on May 24, 2006 (2 pages).
Google Groups "javascript counter script," retrieved from <http://groups.google.com/group/comp.database.oraclelbrowse_thread/thread/97671e385d1bac94n77a82875e328555?q=javascript+counter+sc . . . >, retrieved on May 24, 2006 (2 pages).
Google Groups "javascript exploit," retrieved from <http://groups.google.com/group/comp.sys.mac.misclbrowse_thread/thread/f9285c7d4e4354cd/eb94d5066981 0159?q=javascript+exp;oit&mum>, retrieved on May 24, 2006 (2 pages).
Google Groups, "hit counter" retrieved from <http://groups.google.com/group/comp.infosystems.www.authoring.html/browse_thread/e515dad2e5d1e8cc/0ebdc329e9ec00cc?q=hit . . . > retrieved on May 24, 2006 (7 pages).

(56) References Cited

OTHER PUBLICATIONS

Google Groups, "access counters," retrieved from <http://groups.google.com/group/comp.infosystems.www.authoring.html/browse_thread/dfb1a837f29e165e/a0e0e6a131c6102d?q=access . . . > retrieved on May 24, 2006 (3 pages).
Google Groups, "cgi hit counter," retrieved from <http://groups.google.com/group/comp.lang.perl/browse_thread/thread/b4ef428d8c96d525/3e18b779b1dad79e?q=cgi+hit+counter & mum=74 & . . . > retrieved on May 24, 2006 (2 pages).
Google Groups, "cgi hit counter," retrieved from <http://groups.google.com/group/comp.infosystems.www.users/browse_thread/thread/390de231bb3f0097/64bddc80086f124b?q=cgi+hit+counter> retrieved on May 24, 2006 (2 pages).
Google Groups, "Garrett Casey," retrieved from <Google Groups: comp.infosysems.www.authoring.cgi>, 2007 (2 pages).
Google Groups, "Garrett Casey counter," Jul. 2, 1996, retrieved from <Google Groups: comp.infosystems.www.misc.entrepreneurs>, 2007 (3 pages).
Google Groups, "javascript," retrieved from <http://groups.google.com/group/comp.society.privacr/browse_thread/thread/9b12496aeda7fd78/dd2ebe5f8966fd05?q=javascript&mum=1&hl>, retrieved on May 24, 2006 (3 pages).
Google Groups, "wusage 1.0," retrieved from <http://groups.google.com/group/comp.infosystems.www/browse_thread/thread/a07834d8b38dbc4f/f05bf1df25d47fd3?q=wusage+1.0&mum=1 . . . >, retrieved on May 24, 2006 (2 pages).
Google Groups, "getstats," retrieved from <http://groups.google.com/group/comp.infosystems.www/browse_thread/thread/1009129de1aaf6aa/ed924b219923cc7d?q=getstats&mum=1 & hl . . . >, retrieved on May 24, 2006 (3 pages).
Gotta et al., "Performance Evaluation of Web Applications," Proceeding of the Computer Measurement Group International Conference, 1998 (13 pages).
Greenberg, "Using Unix: Collected Traces of 168 Users," Advanced Technologies, The Alberta Research Council, 1988 (14 pages).
Grobe, "An Early History of Lynx: Multidimensional Collaboration," Academic Computing Services, University of Kansas, Apr. 10, 1997, retrieved from <http://people.cc.ku.edu/~grobe/early-lynx.html>, retrieved on May 24, 2006 (8 pages).
Gundavaram, "CGI Programming on the World Wide Web," 1996 (933 pages). (Uploaded in 2 parts).
Hallam-Baker et al., "Extended Log File Format," W3C Working Draft WD-logfile-960323, retrieved from <http://www.w3.org/TR1WD-logfile.html>, retrieved on May 24, 2006 (6 pages).
Hansen et al., "Automated System Monitoring and Notification With Swatch," Seventh System Administration Conference (LISA '93), Monterey California, Nov. 1993 (9 pages).
Haran, "PC-Meter Tracks Computer Users," Advertising Age, Oct. 2, 1995, retrieved from <http://adage.com/print/85520>, retrieved on Jun. 2, 2015 (2 pages).
Hello Net! Counter, filed Aug. 21, 2007 (1 page).
Highbeam Research, "Harris Computer Systems and Webster Network Strategies Announce Alliance to Offer WWW Monitoring Capabilities Through Firewalls," Business Wire, Mar. 4, 1996, retrieved from <http://www.highbeam.com> (5 pages).
Hilbert et al., "Agents for Collecting Application Usage Data Over the Internet," Department of Information and Computer Science, University of California, Irvine, retrieved from <http://www.ics.uci.edu/~redmiles/publications/C027-HR98.pdf>, retrieved on Oct. 1, 2015 (8 pages).
Holgermetzger, "A Netscape Timeline," Mar. 1993 through Mar. 17, 2006, retrieved from <http://www.holgermetzger.de/Netscape_History.html,> retrieved on May 24, 2006 (4 pages).
"Horace's Java—Page View Timer Demo—Form 1," Aug. 7, 1999 (2 pages).
Horak, "IOMON—Protected Mode I/O Port Monitor," Technical University of Prague, Faculty of Nuclear Science and Physical Engineering, Jan. 1992 (6 pages).
Houston, "A Vision of Advertising Technology—How It Will Work and Why Advertisers Must Involve Themselves in the Process," Modern Media, Aug. 1994, retrieved from <http://www.web.archive.org/web/19961111095749/www.modernmedia.com/clippings/articles/sm . . . >, retrieved on Jun. 8, 2005 (6 pages).
Ibiblio, "Ibiblio—Ten Years in the Making—Aligning the Sites," retrieved from <http://www.ibiblio.org/history/> , retrieved on May 24, 2006 (10 pages).
W3, "Logging Control in W3C httpd," retrieved from <http://www.w3.org/Daemon/User/Config/Logging.html,> retrieved on May 24, 2006 (3 pages).
Intellectual Property Office of the United Kingdom, "Examination Report," issued in connection with United Kingdom Patent Application No. GB0920943.8, dated Apr. 11, 2011 (5 pages).
Intellectual Property Office of the United Kingdom, "Examination Report," issued in connection with United Kingdom Patent Application No. GB0920943.8, dated Nov. 10, 2010 (6 pages).
International Searching Authority, "International Search Report," issued in connection with International Patent Application No. PCT/US2015/015219, dated May 22, 2015 (4 pages).
International Searching Authority, "Written Opinion," issued in connection with International Patent Application No. PCT/US2015/015219, dated May 22, 2015 (7 pages).
International Searching Authority, "International Preliminary Report on Patentability," issued in connection with International Patent Application No. PCT/US2015/015219, dated Aug. 25, 2016 (9 pages).
International Bureau, "International Preliminary Report on Patentability," issued in connection with International Patent Application No. PCT/US2008/059874, dated Dec. 1, 2009 (7 pages).
International Preliminary Examining Authority, "International Preliminary Examination Report," issued in connection with International Patent Application No. PCT/AU00/00937, dated Nov. 2, 2001 (3 pages).
International Searching Authority, "International Search Report," issued in connection with International Patent Application No. PCT/US2008/059874, dated Mar. 2, 2009 (3 pages).
International Searching Authority, "Written Opinion," issued in connection with International Patent Application No. PCT/US2008/059874, dated Mar. 2, 2009 (5 pages).
IP Australia, "Examiner's First Report," issued in connection with Australian Patent Application No. 2008260397, dated Nov. 17, 2010 (2 pages).
IP Australia, "Notice of Acceptance," issued in connection with Australian Patent Application No. 2008260397, dated Aug. 7, 2012 (2 pages).
Ivler, "Advertising Models and Associated Software . . . ," Google Groups, May 15, 1996 (5 pages).
Japan Patent Office, "Notice of Reasons for Rejection," issued in connection with Japanese Patent Application No. 2001-516087, dated Jan. 25, 2011 (8 pages).
Japan Patent Office, "Notice of Reasons for Rejection," issued in connection with Japanese Patent Application No. 2001-516087, dated May 18, 2010 (14 pages).
Javapage, "JAVA," retrieved from <http://web.archive.org/web/20040712072256/http://www.groton.k12.ct.us/WWW/fsr/student/Spring02/W . . . >, retrieved on May 24, 2006 (4 pages).
JavaWorld, JavaWorld Editorial Calendar, Feb. 26, 1996 (1 page).
JavaWorld, JavaWorld: IDG's Magazine for the Java Community, vol. 1, Issue 1, retrieved from <www.javaworld.com>. Mar. 8, 1996 (1 page).
JavaWorld, JavaWorld: IDG's Magazine for the Java Community, vol. 1, Issue 2, retrieved from <www.javaworld.com>. Apr. 1, 1996 (1 page).
Johnson, "Automatic Touring in a Hypertext System," IEEE Twelfth Annual International Phoenix Conference on Computers and Communications, 1993 (7 pages).
Johnson, "Implementation Guide, HBX On-Demand Web Analytics," WebSideStory, Inc., 2006 (12 pages).
Kamba et al., "The Krakatoa Chronicle—An Interactive, Personalized, Newspaper on the Web," Georgia Institute of Technology, 1995 (15 pages).
Kamba, "Personalized Online Newspaper," NEC, vol. 49, No. 7, 1996 (6 pages).

(56) References Cited

OTHER PUBLICATIONS

Kent et al., "Official Netscape JavaScript Book," 1996 (550 pages). (Uploaded in 2 parts).
Kiesler et al., "Homenet: A Field Trial of Residential Internet Services," Carnegie Mellon University, Apr. 1995, retrieved from <http://homenet.hcii.cs.cmu.edu/progress/report1.html> (12 pages).
Kraut et al., "Homenet: A Field Trial of Residential Internet Services," Carnegie Mellon University, Apr. 1995, retrieved from <http://www.acm.org/sigchi/chi96/proceedings/papers/Kraut/rek_txt.htm> (14 pages).
Kugel et al., "Decay Effects in Online Advertising: Quantifying the Impact of Time Since Last Exposure," Presented at the ARF 50th Annual Convention, New York City, Apr. 26-28, 2004 (19 pages).
Lamers, "WebThreads, LLC of Vienna, VA, USA is Pleased to Announce WebThreads™ 1.0.1 Website Interactivity and Visitor Tracking Solution," Oct. 8, 1996 (5 pages).
Lee et al., "Intelligent Agents for Matching Information Providers and Consumers on the World-Wide-Web," Proceedings of the Thirtieth Annual Hawaii International Conference on System Sciences, IEEE, 1997 (11 pages).
Levine, "Computer Privacy Digest V8#024" Computer Privacy Digest, retrieved from <http://web.archive.org/web/20000829051834/itu.rdg.ac.uk/misc/Mailing_Lists/cpd/00000002.htm>, retrieved on May 24, 2006 (19 pages).
Lubow, "An Engineer's Guide to Autocad," Industrial Engineering, vol. 19, No. 8, Aug. 1987 (6 pages).
Long, "Gwstat v1.1—Generate Graphs of HTTPD Server Traffic," BUBL Administrator, Jul. 14, 1994, retrieved from <http://www.bubl.ac.uk//archive/internet/www/servers/gswtat6.htm>, retrieved on Jun. 12, 2006 (1 page).
Loverso, "Netscape Nav. 2.0 Exposes User's Browsing History," The Risks Digest, vol. 7, No. 79, Feb. 23, 1996 (2 pages).
Lynnworth, "Tracking Home Page Hits," Dr. Dobbs Journal, Dec. 1, 1995, retrieved from <http://www.drdobbs.com/article/print?articleId=184409739&siteSectionName=web-development>, retrieved on Apr. 30, 2015 (7 pages).
Marchionini, "Information-Seeking Strategies of Novices Using a Full-Text Electronic Encyclopedia," journal of the American Society for Information Science, vol. 40, No. 1, 1989 (16 pages).
Mayer-Schonberger, "The Internet and Privacy Legislation: Cookies for a Treat?" West Virginia University, retrieved from <http://web.archive.org/web/19990203034203/www.wvjolt.wvu.edu/wvjolt/current/issue1/articles/mayer/ . . . >, retrieved on May 24, 2006 (7 pages).
McCanne et al., "The BSD Packet Filter: A New Architecture for User-level Packet Capture," Lawrence Berkeley Laboratory, Berkeley, CA, Dec. 19, 1992 (11 pages).
McGee, "Web Pages: A Programmer's Perspective," Jun. 10, 1996, retrieved from <http://www.dfpug/loseblattsammlung/migration/whitepapers/webpages.htm>, retrieved on Mar. 22, 2007 (13 pages).
McGrath, "The Tail-Less Mouse," Computer Graphics World, vol. 11, Oct. 1988 (5 pages).
McGraw et al., "Untangling the Woven Web: Testing Web-based Software," Reliable Software Technologies Corporation, Apr. 1, 1996 (9 pages).
McKenzie et al., "An Empirical Analysis of Web Page Revisitation," Department of Computer Science, University of Canterbury, 2001 (7 pages).
Mediaweek, "Nielsen Unveils National TV/Internet Fusion," www.mediaweek.com, Nov. 1, 2006 (2 pages).
Microsoft Corporation, "Screen Shots of Windows NT 3:1," retrieved from <http://www.cs.umd.edu/hcil/muiseum/systems/winnt31src.html>, retrieved on Jun. 7, 2005 (4 pages).
Mobasher, "Data Cleaning: Next: Transaction Identification Up: Preprocessing Tasks," retrieved from <http://maya.cs.edpaul.edu/~mobasher/webminer/survey/node11 .html>, 1997 (1 page).
Mobasher, "Pattern Discovery from Web Transactions: Next:Preprocessing Tasks Up: Web Mining: Information and Previous: Pattern Analysis Tools," retrieved from <http://maya.cs.edpaul.edu/~mobasher/webminer/survey/node9.html>, 1997 (1 page).
Mobasher, "Preprocessing Tasks: Next: Data Cleaning Up: Pattern Discovery from Previous: Patten Discovery from . . . ," retrieved from <http://maya.cs.edpaul.edu/~mobasher/webminer/survey/node10.html>, 1997 (1 page).
Mobasher, "A Taxonomy of Web Mining: Next: Web Content Mining Up: Web Mining: Information and Previous: Introduction," retrieved from <http://maya.cs.edpaul.edu/~mobasher/webminer/survey/node2.html>, 1997 (1 page).
Mobasher, "Agent-Based Approach: Next Database Approach Up: Web Content Mining Previous: Web Content Mining," retrieved from <http://maya.cs.edpaul.edu/~mobasher/webminer/survey/node4.html>, 1997 (2 pages).
Mobasher, "Content Mining: Next: Agent-Based Approach Up: A Taxonomy of Previous: A Taxonomy of," retrieved from <http://maya.cs.edpaul.edu/~mobasher/webminer/survey/node3.html>, 1997 (1 page).
Mobasher, "DataBase Approach: Next Web Usage Mining Up: Web Content Mining Previous: Agent-Based Approach," retrieved from <http://maya.cs.edpaul.edu/~mobasher/webminer/survey/node5.html>, 1997 (2 pages).
Mobasher, "Introduction, Next: A Taxonomy of UP: Web Mining: Information and Previous: Web Mining: Information and ---," retrieved from <http://maya.cs.edpaul.edu/~mobasher/webminer/survey/node1.html>, 1997 (2 pages).
Mobasher, "Pattern Analysis Tools: Next: Pattern Discovery from Up: Web Usage Mining Previous: Pattern Discovery Tool," retrieved from <http://maya.cs.edpaul.edu/~mobasher/webminer/survey/node8.html>, 1997 (2 pages).
Mobasher, "Pattern Discovery Tools: Next: Pattern Analysis Tools Up: Web Usage Mining Previous: Web Usage Mining," retrieved from <http://maya.cs.edpaul.edu/~mobasher/webminer/survey/node7.html>, 1997 (2 pages).
Mobasher, "Web Usage Mining: Next: Pattern Discovery Tools Up: A Taxonomy of Previous: Database Approach," retrieved from <http://maya.cs.edpaul.edu/~mobasher/webminer/survey/node6.html>, 1997 (2 pages).
Mobasher, "Discovery Techniques in Web Transactions," retrieved from <http://maya.cs.edpaul.edu/~mobasher/webminer/survey/node13.html>, 1997 (1 page).
Mobasher, "Path Analysis," retrieved from <http://maya.cs.edpaul.edu/~mobasher/webminer/survey/node14.html>, 1997 (1 page).
Mobasher, "Transaction Identification," retrieved from <http://maya.cs.edpaul.edu/~mobasher/webminer/survey/node12.html>, 1997 (1 page).
Mobasher, "Association Rules," retrieved from <http://maya.cs.edpaul.edu/~mobasher/webminer/survey/node15.html>, 1997 (1 page).
Mobasher, "Sequential Patterns," retrieved from <http://maya.cs.edpaul.edu/~mobasher/webminer/survey/node16.html>, 1997 (1 page).
Mobasher, "Clustering and Classification," retrieved from <http://maya.cs.edpaul.edu/~mobasher/webminer/survey/node17.html>, 1997 (1 page).
Mobasher, "Analysis of Discovered Patterns," retrieved from <http://maya.cs.edpaul.edu/~mobasher/webminer/survey/node18.html>, 1997 (1 page).
Mobasher, "Visualization Techniques," retrieved from <http://maya.cs.edpaul.edu/~mobasher/webminer/survey/node19.html>, 1997 (1 page).
Mobasher, "OLAP Techniques," retrieved from <http://maya.cs.edpaul.edu/~mobasher/webminer/survey/node20.html>, 1997 (1 page).
Mobasher, "Data and Knowledge Querying," retrieved from <http://maya.cs.edpaul.edu/~mobasher/webminer/survey/node21.html>, 1997 (1 page).
Mobasher, "Usability Analysis," retrieved from <http://maya.cs.edpaul.edu/~mobasher/webminer/survey/node22.html>, 1997 (1 page).
Mobasher, "Web Usage Mining Architecture," retrieved from <http://maya.cs.edpaul.edu/~mobasher/webminer/survey/node23.html>, 1997 (1 page).
Mobasher, "Research Directions," retrieved from <http://maya.cs.edpaul.edu/~mobasher/webminer/survey/node24.html>, 1997 (1 page).
Mobasher, "Data Pre-Processing," retrieved from <http://maya.cs.edpaul.edu/~mobasher/webminer/survey/node25.html>, 1997 (1 page).
Mobasher, "The Mining Process," retrieved from <http://maya.cs.edpaul.edu/~mobasher/webminer/survey/node26.html>, 1997 (1 page).

(56) References Cited

OTHER PUBLICATIONS

Mobasher, "Analysis of Mined Knowledge," retrieved from <http://maya.cs.edpaul.edu/~mobasher/webminer/survey/node27.html>, 1997 (1 page).
Mobasher, "Conclusion," retrieved from <http://maya.cs.edpaul.edu/~mobasher/webminer/survey/node28.html>, 1997 (1 page).
Mobasher, "References," retrieved from <http://maya.cs.edpaul.edu/~mobasher/webminer/survey/node29.html>, 1997 (1 page).
Mobasher, "About This Document," retrieved from <http://maya.cs.edpaul.edu/~mobasher/webminer/survey/node30.html>, 1997 (1 page).
Mogul, "Efficient Use of Workstations for Passive Monitoring of Local Area Networks," WRL Research Report 90/5, Western Research Laboratory, Jul. 1990 (29 pages).
Mosaic Communications Corporation, "Welcome to Netscape," retrieved from <http://www.hnehosting.com/mirrors/Origin_of_a_Browser/mcom.10.1994/home/welcome.html>, retrieved on May 24, 2006 (2 pages).
Mulvenna et al., "The 'Soft-Push:' Mining Internet Data for Marketing Intelligence," Working Conference: Electronic Commerce in the Framework of Mediterranean Countries Development, Ioannina, Greece (12 pages).
Montgomery, "Using Clickstream Data to Predict WWW Usage," Aug. 1999 (27 pages).
Mueller, "InfoTicker Java Applet," Google Groups, May 11, 1996, retrieved from <http://groups.google.com/group/comp.infosystems.www.announce/browse_thread/thread/cc . . . >, retrieved on May 2, 2006 (2 pages).
Muquit, "WWW Homepage Access Counter and Clock!" retrieved from <http://www.muquit.com/muquit/software/Count/Count.html>, retrieved on May 24, 2006 (32 pages).
Naor et al., "Secure Accounting and Auditing on the Web," Computer Networks and ISDN Systems, vol. 30, 1998 (10 pages).
Nardone, "The Modem Media Internet Reach and Involvement Scale (IRIS)," Modem Media, Feb. 1995, retreived from <http://web.archive.org/web/19961111095728/www.modernmedia.com/clippings/articles/iris>, retrieved on Jun. 8, 2005 (3 pages).
National Defense University, "Information Operations Timeline," retrieved from <http://www.jfsc.ndu.edu/schools_programs/jciws/iw/io_timeline.asp>, retrieved on May 24, 2006 (9 pages).
Naughton, "The JAVA Handbook," 1996 (424 pages). (Uploaded in 2 parts).
NCSA, "In the Beginning There was NCSA Mosaic . . . " NCSA, retrieved from <http://www.ncsa.uiuc.edu/News/MosaicHistory/>, retrieved on Jun. 12, 2006 (15 pages).
Net.Genesis et al., "Build a Web Site: The Programmer's Guide to Creating, Building, and Maintaining Web Presence," 1995 (721 pages). (Uploaded in 3 parts).
Netscape, Mosaic Communications Changes Name to "Netscape Communications Corporation," Netscape Communications Corporation, retrieved from <http://www.holgermetzger.de/netscape/NetscapeCommunicationsNewsRelease.htm>, retrieved on May 24, 2006 (2 pages).
Netscape Communication and Sun Microsystems, "Sun and Netscape Announce JavaScript," Dec. 4, 1995 (8 pages).
Neumann, "Forum on Risks to the Public in Computers and Related Systems," Risks-Forum Digest, vol. 17, Issue 83, Mar. 4, 1996 (11 pages).
Nielsen, "Classic HTTP Documents," 1995, retrieved from <http://www.w3.org/Protocols/Classic.html>, retrieved on May 24, 2006 (1 page).
O'Connell, "A New Pitch: Advertising on the World Wide Web is a Whole New Ball Game," Modern Media, May 1995, retrieved from <http://web.archive.org/web/19961111095738/www.modernmedia.com/clippings/articles/ne . . . >, retrieved on Jun. 8, 2005 (8 pages).
Older Counter.html history, "Older History of Changes," retrieved from <http://www.ualberta.ca/GEO/Counter.History.html>, retrieved on May 24, 2006, (8 pages).
Ostermann, "Tcptrace Homepage," tcptrace.org, retrieved from <http://www.tcptrace.org, retrieved on Jun. 12, 2006 (1 page).
Ousterhout et al., "A Trace-Driven Analysis of the UNIX 4.2 BSD File System," Computer Science Division, Electrical Engineering and Computer Sciences, University of California, Apr. 25, 1985 (30 pages).
Padmanabhan et al., "Analysis of Web Site Usage Data: How Much Can We Learn About the Consumer from Web Logfiles?," Working Paper IS-96-18, Dec. 1996 (33 pages).
Pallap, "Marketing on the Internet," Journal of Consumer Marketing, vol. 13, No. 4, Aug. 1996 (17 pages).
Perlman, "Asynchronous Design/Evaluation Methods for Hypertext Technology Development," Hypertext '89 Proceedings, Nov. 1989 (21 pages).
Pew, "Instant Java," Sun Microsystems, Inc., 1996 (370 pages).
Philip Morris, "Teenage Attitudes and Behavior Study Methodology 2006" (9 pages).
Pierrakos et al., "Web Usage Mining as a Tool for Personalization: A Survey," User Modeling and User-Adapted Interaction, vol. 13, 2003 (62 pages).
Pitkow et al., "A Simple Yet Robust Caching Algorithm Based on Dynamic Access Patterns," Proceedings of the Second International WWW Conference, GVU Technical Report; VU-GIT-94-39 (8 pages).
Pitkow et al., "Results From the First World-Wide Web User Survey," Journal of Computer Networks and ISDN Systems, vol. 27, No. 2, 1994 (15 pages).
Pitkow et al., "Using the Web as a Survey Tool: Results From the Second WWW User Survey," Third International WWW Conference, GVU Technical Report: GVU-GIT-94-40 (12 pages).
Pitkow et al., "Results From the Third World-Wide Web User Survey,"Graphics, Visualization, & Usability Center, Georgia Institute of Technology (10 pages).
Poler, "Improving WWW Marketing Through User Information and Non-Intrusive Communication," Internet Profiles Corporation (I/PRO) (4 pages).
Powell, "Tomorrow's Heavyweight?" Network World, vol. 15, No. 49, Dec. 7, 1998 (1 page).
PR Newswire Accoc., Inc., "I/PRO is First to Develop a Solution for Measuring Java Applets," Apr. 1996 (2 pages).
Progressive Networks, Inc., "RealServer Administration and Content Creation Guide Version 4.0," Progressive Networks, Inc., 1995-1997 (366 pages).
Progressive Networks, Inc., "Realaudio Server Administration and Content Creation Guide Version 3.0," Progressive Networks, Inc., 1995-1996 (292 pages).
Raggett, "HTML 3.2 Reference Specification," W3C, 1997, retreived from <http://www.w3.org/TR/REC-htm132>, retrieved from Mar. 22, 2007 (49 pages).
Realnetworks Inc., "RealServer Administration Guide Version 5.0," 1995-1997 (262 pages).
Realnetworks, "Real System 5.0 Security Features Whitepaper," 1997 (10 pages).
Regents of the University of California, "Changes to wwwstat: httpd Logfile Analysis Package," 1994,1996, retrieved from <http://ftp.ics.uci.edu/pub/websoft/wwwstat/Changes>, retrieved on Jun. 12, 2006 (4 pages).
Resonate, "Network Traffic Mangement, Database Traffic Management," Resonate, Inc. 2005 (2 pages).
Reuters, "Study Faults Online v, FTC Probes," Googel Groups, Mar. 28, 1996 (3 pages).
Rodley, "Writing JAVA Applets," 1996 (430 pages). (Uploaded in 2 parts).
Rust et al., "An Audience Flow Model of Television Viewing Choice," Marketing Science, vol. 3, No. 2, Spring 1984 (12 pages).
Schmittlein, "Why Does the NBD Model Work?" Marketing Science, vol. 4, No. 3, Summer 1985 (1 page).
Seshan et al., "SPAND: Shared Passive Network Performance Discovery," Proceedings of the USENIX Symposium on Internet Techonoligies and Systems, Monterey, California, Dec. 1997 (13 pages).
Shahabi et al., "Knowledge Discovery from Users Web-Page Navigation," 1997 retrieved from <http://www.ict.griffith.edu.au/~vlad/teaching/kdd.d/readings.d/shahabi97knowledge.pdf> (11 pages).

(56) References Cited

OTHER PUBLICATIONS

Shepard, "TCP Packet Trace Analysis," MIT/LCS/TR-494, MIT Laboratory for Computer Science, Feb. 1991 (70 pages).

Siochi et al., "Computer Analysis of User Interfaces Based on Repetition in Transcripts of User Session," ACM Transactions on Information System, vol. 9, No. 4, (27 pages).

Staten, "Navigator Tricks Raise Concerns," MacWeek, vol. 10, No. 11, Mar. 1996 (2 pages).

Stengle, "Tying TV Advertising to Action: Leveraging the Second Screen to Raise the Effectiveness & Measurability of TV Advertising," BlackArrow USA, 2012 (8 pages).

Sukaviriya et al., "A Second Generation User Interface Design Environment: The Model and The Runtime Architecture," Graphics, Visualization & Usability Center, Georgia Institute of Technology, Sep. 1992 (10 pages).

Sunsite, "Hot Java README and Link to the Software on SunSITE," SunSITE Software Information and Technology Exchange, retrieved from http://www.ibiblio.org/hotjava/, retrieved on May 24, 2006 (1 page).

Symantec, "Using Norton pcANYWHERE for DOS," Symantec Corporation, 1994 (30 pages).

"Tcpslice(8):—Linux Man Page," retrieved from <http://www.die.net/doc/linux/man/man8/tcpslice.8.html>, retrieved on Jun. 12, 2006 (3 pages).

Tapley et al., "The Official Gamelan Java Directory," Earth Web, 1996 (6 pages).

"Tcpslice—Linux Command—Unix Command," 2006, retrieved from <http://linux.about.com/library/cmd/blcmd18_tcpslice.htm>, retrieved on Jun. 12, 2006 (3 pages).

The Nielsen Company (US), LLC, "Complaint for Patent Infringement," filed with the United States District Court for the Eastern District of Virginia Alexandra Division and transferred to the Norfolk Division on Mar. 15, 2011 (13 pages).

Thielman, "Comcast Pushes VOD Reruns into the C3 Window," Adweek, Dec. 2, 2013, retrieved from <http://www.adweek.com/news/television/comcast-pushes-vod-reruns-c3 . . . >, retrieved on Feb. 10, 2014 (1 page).

Thomson Jr., "Creation of the NSFnet," Commercialization of the Internet, 2000, retrieved from <http://johnthomson.org/j561/NSFcreate-4.html>, retrieved on May 24, 2006 (2 pages).

Thomson Jr., "The Beginning of Commercialization of the NSFnet," Commercialization of the Internet, 2000, retrieved from <http://johnthomson.org/j561/NSEcomm-5.html>, retrieved on May 24, 2006 (1 page).

Thomson Jr., "Criticism of the NSF Grows," Commercialization of the Internet, 2000, retrieved from <http://johnthomson.org/j561/NSFcriticism-6.html>, retrieved on May 24, 2006 (1 page).

Thomson Jr., "The NSF Starts to Change Their Policy," Commercialization of the Internet, 2000, retrieved from <http://johnthomson.org/j561/NSFpolicy-7.html>, retrieved on May 24, 2006 (1 page).

Thomson Jr., "Changes in NSF Policy Becomes Law—The Internet is Commercialized," Commercialization of the Internet, 2000, retrieved from <http://johnthomson.org/j561/NSFpolicy-9.html>, retrieved on May 24, 2006 (1 page).

tcpdump.org, "Tcpdump—dump traffic on a network," retrieved from <http://www.tcpdump.org/tcpdump_man.html>, retrieved on Jun. 12, 2006 (26 pages).

Tolle, "Performance Measurement and Evaluation of Online Information Systems," Proceedings of the 1985 ACM Computer Science Conference-Agenda for Computing Research:The Challenge for Creativity, Mar. 12-14, 1985 (8 pages).

"Tradewinds," Harvard Business School, vol. 2, No. 5, May 1995 (11 pages).

United States Patent and Trademark Office, "Non-Final Office Action," issued in connection with U.S. Appl. No. 14/866,158, dated Sep. 23, 2016 (8 pages).

United States Patent and Trademark Office, "Final Office Action," issued in connection with U.S. Appl. No. 12/100,685, dated Nov. 16, 2009 (69 pages).

United States Patent and Trademark Office, "Non-Final Office Action," issued in connection with U.S. Appl. No. 12/100,685, dated Feb. 12, 2009 (20 pages).

United States Patent and Trademark Office, "Final Office Action," issued in connection with U.S. Appl. No. 09/763,338, dated Jul. 12, 2007 (20 pages).

United States Patent and Trademark Office, "Non-Final Office Action," issued in connection with U.S. Appl. No. 12/100,698, dated Jan. 20, 2010 (18 pages).

United States Patent and Trademark Office, "Non-Final Office Action," issued in connection with U.S. Appl. No. 12/100,698, dated Sep. 25, 2009 (17 pages).

United States Patent and Trademark Office, "Non-Final Office Action," issued in connection with U.S. Appl. No. 12/780,890, dated Oct. 1, 2010 (9 pages).

United States Patent and Trademark Office, "Non-Final Office Action," issued in connection with U.S. Appl. No. 13/098,358, dated Jul. 27, 2011 (10 pages).

United States Patent and Trademark Office, "Non-Final Office Action," issued in connection with U.S. Appl. No. 09/763,338, dated Nov. 21, 2006 (18 pages).

United States Patent and Trademark Office, "Notice of Allowance," issued in connection with U.S. Appl. No. 12/100,698, dated Feb. 25, 2011 (12 pages).

United States Patent and Trademark Office, "Notice of Allowance," issued in connection with U.S. Appl. No. 12/100,698, dated Oct. 20, 2010 (11 pages).

United States Patent and Trademark Office, "Notice of Allowance," issued in connection with U.S. Appl. No. 12/780,890, dated Mar. 22, 2011 (12 pages).

United States Patent and Trademark Office, "Notice of Allowance," issued in connection with U.S. Appl. No. 13/098,358, dated Dec. 13, 2011 (12 pages).

United States Patent and Trademark Office, "Notice of Allowance," issued in connection with U.S. Appl. No. 09/763,338, dated Jan. 2, 2008 (7 pages).

United States Patent and Trademark Office, "Notice of Allowance," issued in connection with U.S. Appl. No. 14/313,390, dated Jul. 7, 2015 (8 pages).

United States Patent and Trademark Office, "Non-Final Office Action," issued in connection with U.S. Appl. No. 14/313,390, dated Jan. 22, 2015 (9 pages).

United States Patent and Trademark Office, "Requirement for Restriction/Election," issued in connection with U.S. Appl. No. 09/763,338, dated Aug. 1, 2006 (6 pages).

United States Patent and Trademark Office, "Notice of Allowance," issued in connection with U.S. Appl. No. 14/618,658, dated Oct. 26, 2015 (9 pages).

United States Patent and Trademark Office, "Notice of Allowance," issued in connection with U.S. Appl. No. 15/044,939, dated Apr. 28, 2016 (9 pages).

United States Patent and Trademark Office, "Non-Final Office Action," issued in connection with U.S. Appl. No. 15/044,939, dated Apr. 28, 2016 (9 pages).

User Society, "First International Conference on the World-Wide Web," May 1994, retrieved from <http://www.94.web.cern.ch/WWW94/>, retrieved on May 24, 2006 (2 pages).

w3.org, "CGI—Common Gateway Interface," W3C, retrieved from <http://www.w3.org/CGI/>, retrieved on May 24, 2006 (2 pages).

w3.org, "http: A Protocol for Network Information: Basic HTTP as Defined in 1992," W3C, retrieved from <http://www.w3.org/Protocols/HTTP/HTTP2.html>, retrieved on May 24, 2006 (2 pages).

w3.org, "The World Wide Web Servers: W3 Servers," retrieved from <http://www.w3.org/History/19921103-hypertext/hypertext/DataSources/WWW/Servers.html>, retrieved on May 24, 2006 (2 pages).

w3.org, "The World Wide Web Project," retrieved from <http://www.w3.org/History/19921103-hypertext/hypertext/www/theprojecthtml>, retrieved on May 24, 2006 (1 page).

w3.org, "Demonstrations—JENC92," retrieved from <http://www.w3.org/Conferences/JENC92/Demonstrations.html>, retrieved on May 24, 2006 (1 page).

(56) References Cited

OTHER PUBLICATIONS w3.org, "An Updated Quick Look at Viola WWW," W3C, retrieved from <http://www.w3.org/History/19921103-hyptertext/Viola/Review.html>, retrieved on May 24, 2006 (2 pages).
w3.org, "HyperText Transfer Protocol Design Issues," W3C, retrieved from <http://www.w3.org/Protocols/DesignIssues.html>, retrieved on May 24, 2006 (3 pages).
w3.org, "WorldWideWeb for C5," Presentation, May 17, 1991, retrieved from <http://www.w3.org/Talks/C5_17_May_91.html>, retrieved on May 24, 2006 (1 page).
w3.org, "Change History for httpd," W3C, retrieved from <http://www.w3.org/Daemon/Features.html>, retrieved on May 24, 2006 (15 pages).
W3C, "A Little History of the Word Wide Web (1945-1995)," retrieved from <http://www.w3.org/History.html>, retrieved on May 24, 2006 (6 pages).
Wandschneider, "ActiveX Controls Framework: Sample Code for Authoring Non-MFC Controls," Microsoft Corporation, Apr. 1996, retrieved from <http://msdn.microsoft.com/archive/en-us/dnaractivex/html/msdn_ctrlfmk.asp?frame=true>, retrieved on Mar. 22, 2007 (15 pages).
Warren, "Audience Tracking System for Electronic Newspapers" Google Groups, May 3, 1995.
Watt, "Management Tools Get with the Web," Network World, vol. 14, No. 25, Jun. 23, 1997 (1 page).
Weber, "New Software Helps Advertisers Get Through Tangled Web Pages," The Wall Street Journal, Oct. 1996 (2 pages).
Websidestory and AIG, "On Demand Analytics Presentation," Jun. 22, 2005 (10 pages).
Weiler et al., "Usability Lab Tools: One Year Later," CHI'94, Conference Companion, 1994 (p. 330).
Weston, "Netscape 2.0b2 allows for invasion of privacy," TBTF, Dec. 2, 1995, retrieved from <http://www.tbtf.com/resource/b2-privacy-bug.html>, retrieved on May 24, 2006 (2 pages).
Wilson, "Browser Timelines (Releases Important to HTML and CSS Development = Index DOT Html/Css," retrieved from <http://www.blooberry.com/indexdot/history/browsers6.htm> retrieved on May 24, 2006 (3 pages).
Wilson, "Opera (Opera Software) Index DOT Html/Css," retrieved from <http://www.blooberry.com/indexdot/history/opera.htm> retrieved on May 24, 2006 (3 pages).
Wright, "Matt's Script Archive: Book'em Dano:Readme," 1996 (2 pages).
Wu et al., "Virtual Proxy Servers for WWW and Intelligent Agents on the Internet," Proceedings of the The Thirtieth Annual Hawaii International Conference on System Sciences, 1997 (10 pages).
Yahoo!, "Yahoo! Search Directory > Web Programming > Access Counters," retrieved from <http://dir.yahoo.com/Computers_and_Internet/Internet/World_Wide_Web/Programming/Access_Counters/>, retrieved from May 24, 2006 (5 pages).
Zaiane et al., "Discovering Web Access Patterns and Trends by Applying OLAP and Data Mining Technology on Web Logs," Research and Technology Advances in Digital Libraries, Apr. 1998 (12 pages).
Zeigler, "Startup Net Count Seeks to Tally How Many Web Surfers See Ads," The Wall Street Journal, Oct. 1996 (2 pages).
Zillmer, "How to Make Your Web Ads Pay Off," Marketing Magazine, vol. 101, No. 23, Jun. 10, 1996 (4 pages).
United States Patent and Trademark Office, "Non-final Office Action," issued in connection with U.S. Appl. No. 15/359,129, dated Apr. 5, 2017. (223 pages). (Copy not provided as this is a USPTO document. Applicant will provide document upon request from Examiner.).
United States Patent and Trademark Office, "Final Office Action," issued in connection with U.S. Appl. No. 14/866,158, dated Nov. 30, 2017, 14 pages.
United States Patent and Trademark Office, "Non-Final Office Action," issued in connection with U.S. Appl. No. 14/866,158, dated Mar. 30, 2018, 37 pages.
United States Patent and Trademark Office, "Notice of Allowance," issued in connection with U.S. Appl. No. 15/044,939, dated Aug. 29, 2016 (8 pages).
United States Patent and Trademark Office, "Notice of Allowance," issued in connection with U.S. Appl. No. 14/866,158, dated Nov. 8, 2018 (7 pages).
United States Patent and Trademark Office, "Non-Final Office Action," issued in connection with U.S. Appl. No. 14/866,158, dated May 19, 2017, 18 pages. (Copy not provided as this is a USPTO document. Applicant will provide document upon request from Examiner).
Australian Patent Office, "Patent Examination Report No. 1," issued in connection with Australian patent application No. 2014203758, dated May 12, 2015, 3 pages.
Australian Patent Office, "Notice of Acceptance," issued in connection with Australian patent application No. 2014203758, dated Apr. 29, 2016, 3 pages.
Australian Patent Office, "Certificate of Grant," issued in connection with Australian patent application No. 2014203758, dated Aug. 25, 2016, 1 page.
Canadian Patent Office, "Office Action," issued in connection with Canadian patent application No. 2,856,246, dated Sep. 28, 2015, 5 pages.
Canadian Patent Office, "Office Action," issued in connection with Canadian patent application No. 2,856,246, dated May 5, 2017, 3 pages.
The State Intellectual Property Office of China, "English Translation of First Notification of Office Action," issued in connection with Chinese patent application No. 201410341892.1, dated Aug. 17, 2017, 8 pages.
European Patent Office, "Extended European Search Report," issued in connection with European patent application No. 14002366.4, dated Nov. 27, 2014, 9 pages.
The State Intellectual Property Office of China,"Second Notification of Office action," issued in connection with Chinese patent application No. 201410341892.1, dated Jun. 5, 2017, 8 pages (includes English translation).
United States Patent and Trademark Office, "Notice of Allowance and Fee(s) Due," issued in connection with U.S. Appl. No. 15/359,129, dated Jun. 29, 2017, 21 pages.
IP Australia, "Examination Report No. 1," issued in connection with Australian Patent Application No. 2016213749, dated Jul. 10, 2017, 2 pages.
United States Patent and Trademark Office, "Non-Final Office Action," issued in connection with U.S. Appl. No. 14/313,457, dated Jul. 17, 2017, 88 pages. (Copy not provided as this is a USPTO document. Applicant will provide document upon request from Examiner).
Raghunathan et al. "A Unified Imputation Approach for the treatment and Analysis of Missing Data in Marketing Research" Feb. 1999, 43 pages.
Reiter "Simultaneous Use of Multiple Imputation for Missing Data and Disclosure Limitation" Sep. 29, 2011, 20 pages.
United States Patent and Trademark Office, "Notice of Allowance," issued in connection with U.S. Appl. No. 16/261,035, dated Apr. 15, 2020, 7 pages.

\* cited by examiner

… (1)

METHODS AND APPARATUS TO DETERMINE PROBABILISTIC MEDIA VIEWING METRICS

FIELD OF THE DISCLOSURE

This disclosure relates generally to media viewing metrics such as ratings and shares and, more particularly, to methods and apparatus to determine probabilistic media viewing metrics.

BACKGROUND

Audience viewership of, for example, a television program, may be analyzed to determine ratings and/or shares for the program. Audience viewing behavior data collected from, for example, a viewing panel, may introduce uncertainties into the analysis of the ratings and/or shares. For example there may be uncertainties as to whether a panelist is watching television and, if so, what television channel or program the panelist is watching.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
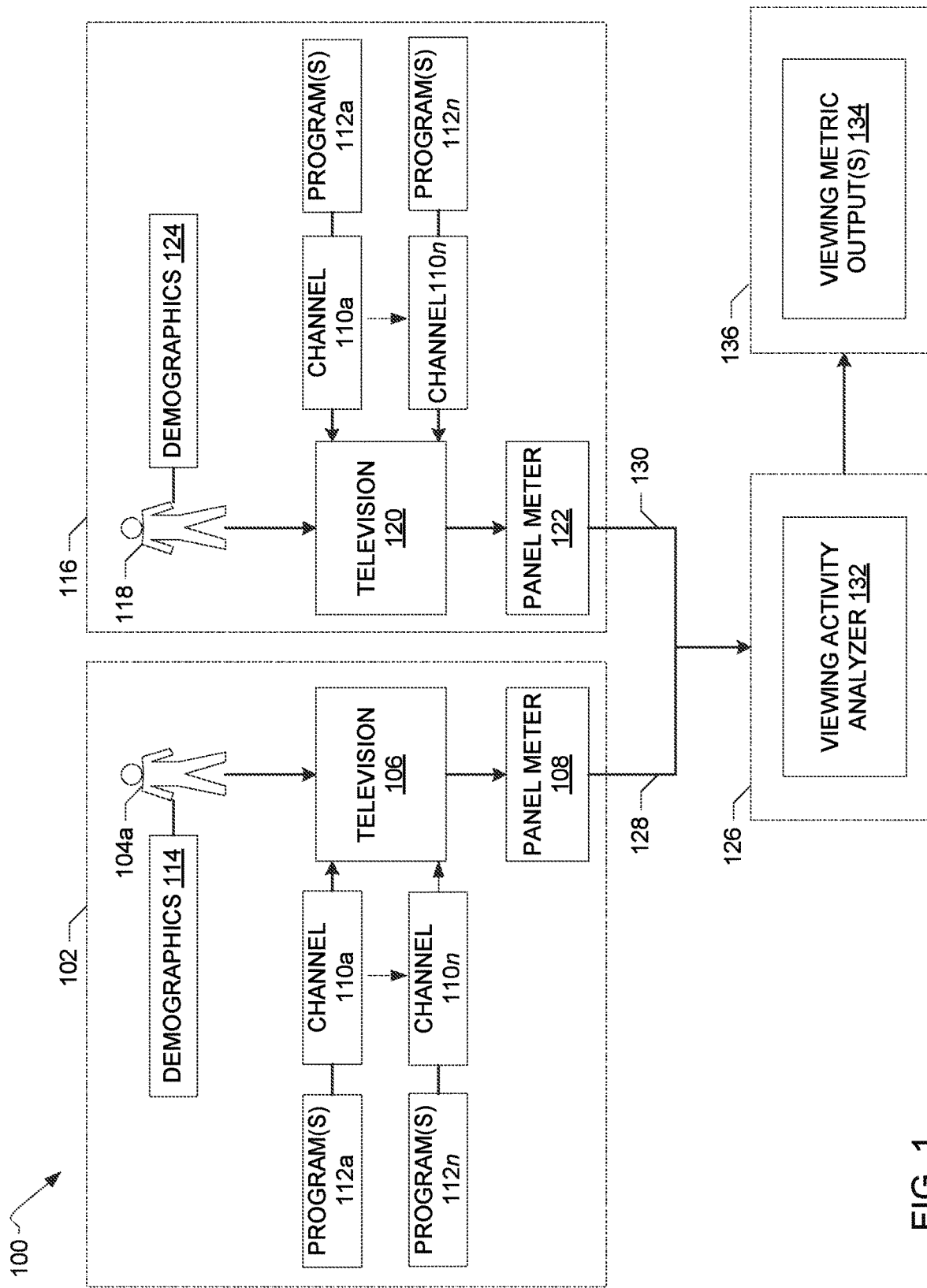
FIG. 1 illustrates an example environment in which a system constructed in accordance with the teachings disclosed herein operates.

Audience viewing data can be collected from a plurality of individuals or households watching, for example, television, to determine ratings and/or shares for one or more television programs. Television ratings represent a number of people (or households) with a television tuned to a particular channel or program divided by a total number of people (or households) that have a television. Thus, ratings consider a potential viewing population, or the total number of people or households that have a television. Television shares represent a percentage of people (or households) watching a particular channel or program out of a viewing population that includes the people (or households) that are watching television at a given time. Thus, determining shares includes considering a population who is watching television at a given time.

When analyzing audience viewing behavior to calculate ratings and/or shares, there may be uncertainties with respect to whether a panelist (e.g., a person in a household selected to participate in ratings research performed by, for example, The Nielsen Company (US), LLC) is watching television and, if so, what television channel and/or program he or she is watching. Uncertainties with respect to identifying audience viewing behavior can arise from, for example, co-viewing of a television program by members of the same household or a malfunction of a television panel meter collecting viewing activity data from the panelist's television. Thus, in some examples, viewing metrics such as ratings and/or shares are determined using data including uncertainties or probabilities with respect to panelist viewing behavior.

For example, for a first panelist, there may be a 50% probability that the first panelist is not watching television or a 50% that the first panelist is watching a first program. As another example, data may be collected from a second panelist indicating that the second panelist is watching television, but there may not be data as to which of a first program, a second program, or a third program the second panelist is watching. Known methods for addressing probabilities or uncertainties with respect to the viewing behavior of, for example, the first panelist and the second panelist include randomly assigning each panelist as viewing a particular television program using a Monte Carlo simulation or a variation thereof. For example, the first panelist who is either not watching television or is watching the first program may be randomly assigned as watching the first program. The second panelist who is watching one of the first program, the second program, or the third program may be randomly assigned to the second program. Thus, in some known methods, each of the first panelist and the second panelist are assigned as watching a particular program or as not watching television (e.g., using "0's" and "1's"), thereby removing uncertainties from the panelist data.

In some known methods, ratings and/or shares can be calculated based on the randomly assigned probability data (e.g., the 0's and 1's) for the first panelist, the second panelist, and/or other panelists. However, in some known methods, a Monte Carlo simulation is only performed once. As a result, ratings information does not account for the fact that the panelists could be watching other programs probabilistically. For example, if the Monte Carlo simulation is performed multiple times, the second panelist could be randomly assigned as watching the first program or the third program instead of the second program. Thus, ratings and/or shares calculated based on random assignment of panelist viewing activity may not accurately reflect a range of possible probabilistic scenarios, as the results are limited by the different scenarios that are generated.

Accuracy of such known methods could be increased if, for example, the Monte Carlo simulation is performed multiple times (e.g., thousands of times) to identify a range of possible scenarios or outcomes with respect to probabilities that a panelist is watching television, what program a panelist is watching, etc. and if the ratings calculated from the different probabilistic scenarios are averaged. However, such known methods are time-consuming and can require significant processing resources to repeat the simulation thousands of times in an effort to capture a wide range of possible probabilistic scenarios or outcomes. Even if the simulation is run multiple times, the results are still limited by the fact that ideally the simulation would be run an infinite number of times.

Examples disclosed herein provide for a determination of viewing metrics such as ratings and/or shares that accounts for substantially all possible viewing scenarios that could happen and a probability of a viewing scenario happening. For example, ratings computed using examples disclosed herein consider that the second panelist could be watching the first program, the second program, or the third program as well as the respective probabilities that the second panelist is watching the one of first, second, or third programs. Examples disclosed herein compute ratings and/or shares for one or more television programs using one or more algorithms that consider the probabilities that a panelist may or may not be watching television, may or may not be watching a certain program, etc. Some examples disclosed herein selectively adjust sampling weights assigned to a panelist in view of the probabilities that the panelist is or is not watching television, is watching a certain program, etc. so as to identify a viewing population that can be used to calculate, for example, shares despite the uncertainties in the data.

Some examples disclosed herein compute variance or covariance metrics for analysis of viewing behavior across two or more television programs. Also, some disclosed examples can analyze ratings, shares, and/or other viewing metrics for a population subgroup or panelist of interest. For example, a demographic group can be analyzed with respect to what program the demographic group is watching or what portion of the demographic group is watching a particular program.

Examples disclosed herein more accurately identify ratings and/or shares with respect to uncertainties or probabilities in viewing behavior data and reduce errors in computing ratings and/or shares as compared to approaches that consider a limited range of probabilistic scenarios, only run a Monte Carlo simulation once, etc. Examples disclosed herein improve computational efficiency and reduce processing resources in considering the many scenarios that could arise for panelists or a group of panelists. Examples disclosed herein substantially eliminate the need to run a probabilistic scenario simulation hundreds or thousands of times. Rather, examples disclosed herein generate results that substantially approximate viewing metrics as if the simulations were performed an infinite number of times. Thus, disclosed examples provide a technical improvement in the field of ratings metrics over known methods that address uncertainties in viewing data in a limited fashion.

Although examples disclosed herein are discussed in the context of media viewing metrics such as television ratings and/or shares, examples disclosed herein can be utilized in other applications. For example, examples disclosed herein could be used for other types of media than television programs, such as radio. Also, examples disclosed herein could be used in applications other than media to analyze behavior of a population with respect to, for example, buying a product such as cereal.

FIG. 1 illustrates an example system 100 for computing viewing metrics such as ratings and/or shares associated with one or more television programs. As illustrated in FIG. 1, a first household 102 includes a first panelist 104. The first household 102 can include additional panelists. The first household 102 includes a first television 106. A first panel meter 108 is communicatively coupled to the first television 106. The first television 106 can be tuned to broadcast one or more channels 110a-110n. Each of the channels 110a-110n can provide one or more media or programs 112a-112n to be viewed via the first television 106 by the first panelist 104.

The first panel meter 108 collects data from the first television 106, such as whether the first television 106 is turned on, to which of the channels 110a-110n the first television is tuned, how long the first television 106 is tuned to the selected channel 110a-110n, what time of day the first television 106 is tuned to the one of the channels 110a-110n, etc. In the example of FIG. 1, the first panelist 104 is associated with a plurality of demographics 114, such as age, gender, ethnicity, household size, etc. In some examples, the demographics 114 include data about the geographic location of the first household 102, socioeconomic status, etc. In some examples, the first panel meter 108 collects and/or stores data about the demographics 114 the first panelist 104 (e.g., via one or more user inputs with respect to the demographics 114 of the first panelist 104, census data, etc.).

The example system 100 includes a second household 116. The second household 116 includes a second panelist 118. The second household can include additional panelists. The second household 116 includes a second television 120 and a second panel meter 122 communicatively coupled to the second television 120. The second panel meter 122 collects data from the second television 120 regarding, for example, which of the channels 110a-110n the second television 120 is tuned to at a given time of day, and other data substantially as disclosed above in connection with the first television 106 and the first panel meter 108. The second meter 122 can collect and/or store data about demographics 124 associated with the second panelist 118 (e.g., age, gender, etc. of the second panelist 118).

The example system 100 can include other households in addition to the first household 102 and the second household 116 (e.g., n households 102, 116). Also any of the households 102, 116 in the example system 100 of FIG. 1 can include one or more panelists (e.g., n panelists 104, 118). Television viewing activity can be collected from any of the households in the example system 100 substantially as described herein with respect to the first and second households 102, 116 of FIG. 1.

In the example system of FIG. 1, the first panel meter 108 and the second panel meter 122 are communicatively coupled to a processor 126 (e.g., via wireless connections) to transmit return path data to the processor 126. The first panel meter 108 transmits a first data stream 128 to the processor 126 including viewing data for the first television 106 of the first household 102. The second panel meter 122 transmits a second data stream 130 to the processor 126 including viewing data for the second television 120 of the second household 102. The respective data streams 128, 130 can include data such as the channel(s) 110a-110n to which each television 106, 120 is tuned at a certain time. The first and second data streams 128, 130 can include demographic data about the panelists 104, 118 of the respective households 102, 116. As disclosed below, the processor 126 stores the data streams 128, 130 for analysis with respect to television viewing metrics.

In some examples, the first data stream 128 and/or the second data stream 130 includes data indicative of one or more uncertainties about the television viewing behavior of the first panelist 104 (or the first household 102) and/or the second panelist 118 (or the second household 116). For example, there may be uncertainty as to whether the first panelist 102 was co-viewing one of the programs 112a-112n with another member of the first household 102. As another example, there may have been a temporary technical error in the collection of data by the first and/or second panel meters 108, 122 (e.g., an inability to collect data from the television (s) 106, 120 for a period of time). Thus, at least a portion of the first data stream 128 and/or the second data stream 130 may include uncertain or probabilistic viewing activity data by the respective panelists 104, 118 (and/or households 102, 116).

The example processor 126 of FIG. 1 includes a viewing activity analyzer 132. The example viewing activity analyzer 132 calculates viewing metrics such as ratings and/or shares for one or more of the programs 112a-112n based on the data in the first data stream 128, the second data stream 130, and/or other data streams received from other households in the example system 100. The example viewing activity analyzer 132 considers any uncertainties in the first data stream 128 and/or the second data stream 130 by calculating the viewing metrics using one or more algorithms that account for probabilities with respect to whether or not the panelist(s) 104, 118 are watching television, what program each panelist 104, 118 is watching, etc.

The example viewing activity analyzer 132 generates one or more viewing metric outputs 134. The viewing metric output(s) 134 can include ratings and/or shares for one or more of the programs 112a-112n. In some examples, the viewing metric output(s) 134 can include analysis results with respect to viewing activity of a population subgroup of interest, such as a particular demographic subgroup (e.g., an age group). The viewing metric output(s) 134 can be presented via one or more output devices 136, such as a display screen of a personal computing device (e.g., associated with the processor 126).

Figure 2:
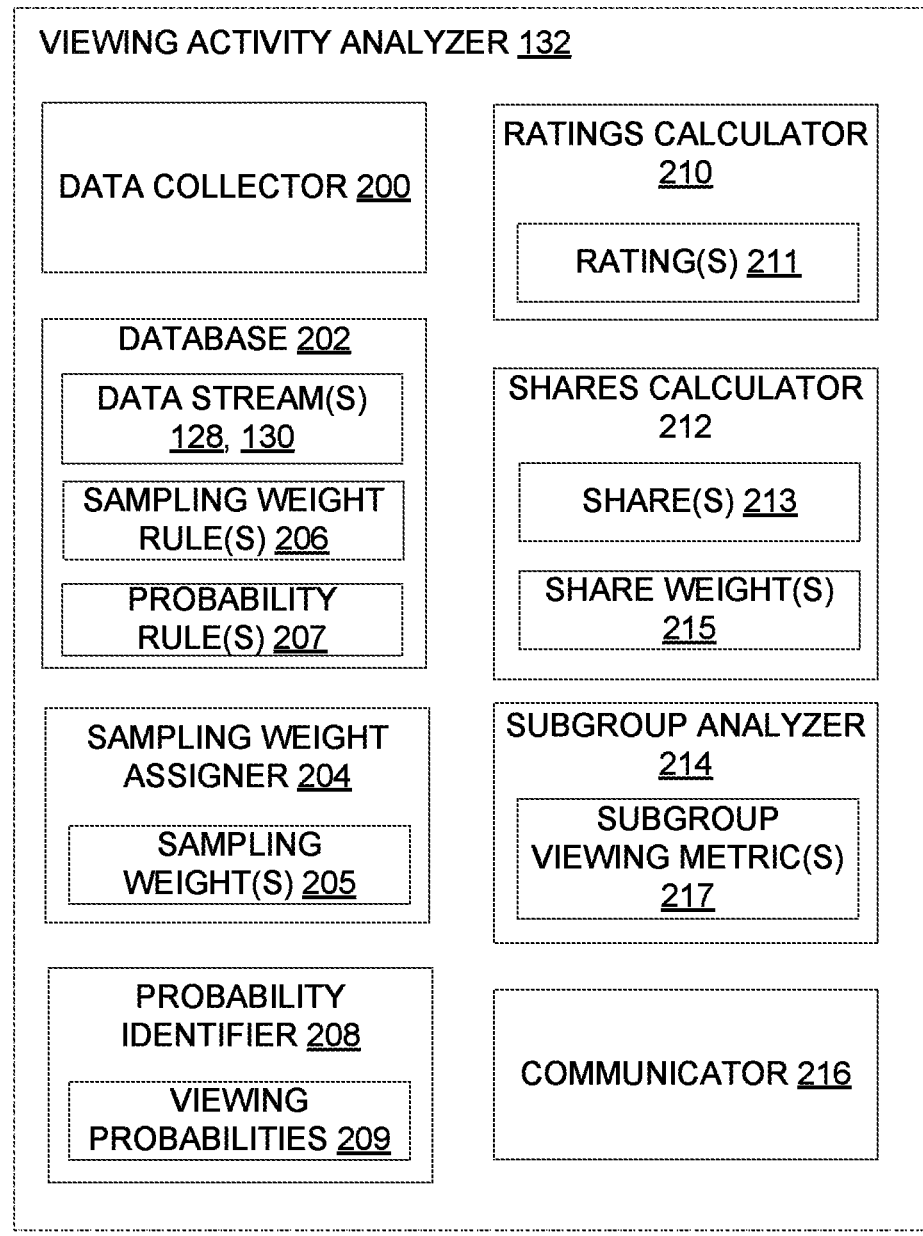
FIG. 2 is a block diagram of an example implementation of a portion of the system of FIG. 1.

FIG. 2 is a block diagram of an example implementation of the viewing activity analyzer 132 of FIG. 1. As illustrated in FIG. 2, the example viewing activity analyzer 132 includes a data collector 200. The example data collector 200 receives one or more of the data streams 128, 130 from the panel meters 108, 122. As disclosed above, the data streams 128, 130 include data such as date, time, and/or duration that the television(s) 106, 120 were turned on; the channel(s) 110a-110n to which the television(s) 106, 120 were tuned; the programs 112a-112n broadcast by the channel(s) 110a-110n; the respective demographics 114, 124 of the panelists 104, 118, etc. In some examples, the data collector 200 filters and/or formats the data streams 128, 130 for processing by the viewing activity analyzer 132. The data streams 128, 130 received by the data collector 200 are stored in a database 202 of the example viewing activity analyzer 132 of FIG. 2.

The example viewing activity analyzer 132 includes a sampling weight assigner 204. The example sampling weight assigner 204 assigns a sampling weight 205 to each panelist 104, 118 based on, for example, the respective demographics 114, 124 of each panelist 104, 118. The sampling weight(s) 205 assigned by the example weight assigner 204 to each panelist 104, 118 is indicative of a number of other television viewers that each panelist 104, 118 represents based on, for example, one or more similar demographics 114, 124 (e.g., age, gender, socioeconomic status). For example, if the sampling weight assigner 204 assigns a sampling weight 205 having a value of ten to the first panelist 104, the first panelist 104 represents ten people sharing similar demographics 114 as the first panelist 104.

In some examples, the sampling weight 205 is based on whether the panel meter(s) 108, 122 were working properly during a time period in which the data of the data stream(s) 128, 130 was collected. For example, if a known power outage affected the first household 102 and, thus, the ability of the first panelist 104 to watch the first television 106 and the first panel meter 108 to collect data, the example sampling weight assigner 204 can adjust the sampling weight 205 assigned to the first panelist 104 to reflect a number of people who were affected by the power outage.

In the example of FIG. 2, the sampling weight(s) 205 assigned to the panelist(s) 104, 118 can be based on one or more sampling weight rule(s) 206 stored in the database 202 of FIG. 2. The sampling weight rules 206 can include one or more rules with respect to a value of the sampling weight(s) 205 to be assigned to each panelist 104, 118 based on demographic factors such as age, gender, household size, etc. The example sampling weight assigner 204 of FIG. 2 compares the demographic data 114, 124 in the data streams 128, 130 to the sampling weight rule(s) 206 to determine the sampling weight(s) 205 to assign to the panelist(s) 104, 118.

The example viewing activity analyzer 132 of FIG. 2 includes a probability identifier 208. The example probability identifier 208 analyzes the first and second data streams 128, 130 to identify any uncertainties in the data streams 128, 130. For example, the probability identifier 208 can identify missing data in the first and/or second data streams 128, 130 with respect to, for example, data regarding whether or not the panelist(s) 104, 118 where watching the television(s) 106, 120, what program(s) 112a-112n the panelist(s) 104, 118 were watching, etc. The probability identifier 208 can identify inconsistencies in the first and/or second data streams 128 such as data corresponding to one or more program(s) 112a-112n that did not air during the time period for which the data was collected. The probability identifier 208 can identify potential co-viewing activity based on, for example, a number of panelists 104, 118 associated with each household 102, 116.

In other examples, the probability identifier 208 does not identify any uncertainties in the first and/or second data streams 128, 130. For example, the data stream(s) 128, 130 can include data with respect to the television program(s) 112a-112n that the panelist(s) 104, 118 were watching that has not been affected by, for example, any technical errors in the data collection.

In some examples, the probability identifier 208 assigns one or more viewing probabilities 209 to the panelist(s) 104, 118 based on the uncertainties identified in the data stream(s) 128, 130 with respect to, for example, whether or not the panelist(s) 104, 118 are watching television, what program(s) 112a-112n the panelist(s) 104, 118 could have watched, etc. The example probability identifier 208 assigns the probabilities 209 based on one or more probability rules 207 stored in the example database 202 of FIG. 2. The probability rules 207 can include predefined rules with respect to probability values to be assigned to the panelists 104, 118 based on, for example, the number of programs 112a-112n that the panelist(s) 104, 118 could be watching at a given time, the sampling weights 205 assigned to the panelist(s) 104, 118, historical viewing data for the respective panelist(s) 104, 118 stored in the database 202, etc.

Table 1, below, is an example table generated by the example probability identifier 208 of FIG. 2. Table 1 includes probabilistic viewing activity for a plurality of panelists (e.g., the panelists 104, 118 of FIG. 1) whose viewing data is received by the data collector 200 of the example viewing activity analyzer 132. Table 1 includes the probabilistic viewing activity with respect to a first program 112a ($P_{112a}$), a second program 112b ($P_{112b}$), and a third first program 112c ($P_{112c}$). Table 1 also includes probabilities with respect to whether or not the panelists are watching television ($P_0$).

TABLE 1

| | Viewing Activity Probabilities | | | | | |
| --- | --- | --- | --- | --- | --- | --- |
| Panelist | Age (e.g., demographics 114, 124) | Sampling Weights (205) | $P_0$ | $P_{112a}$ | $P_{112b}$ | $P_{112c}$ |
| A (e.g., panelist 104) | Young | 10 | 0.5 | .5 | 0 | 0 |
| B (e.g., panelist 118) | Young | 60 | 0 | .33 | .33 | .33 |
| C | Young | 20 | 1 | 0 | 0 | 0 |
| D | Middle | 80 | .1 | .2 | .3 | .4 |

TABLE 1-continued

Viewing Activity Probabilities

| Panelist | Age (e.g., demographics 114, 124) | Sampling Weights (205) | $P_0$ | $P_{112a}$ | $P_{112b}$ | $P_{112c}$ |
|---|---|---|---|---|---|---|
| E | Middle | 40 | 0 | 0 | 1 | 0 |
| F | Middle | 70 | 0 | .3 | .5 | .2 |
| G | Old | 90 | .25 | .25 | .25 | .25 |
| H | Old | 30 | .4 | .3 | .2 | .1 |
| I | Old | 50 | .1 | .7 | 0 | .2 |

As illustrated above, the example Table 1 includes panelist identifiers (e.g., letters A-H), associated demographics (e.g., age), and respective sampling weights 205 assigned to the panelists (e.g., by the sampling weight assigner 204 of the viewing activity analyzer 132). In example Table 1, the values in the third column $P_0$ represent a probability that a respective panelist is not watching television, the values in the fourth column $P_{112a}$ represent a probability that a panelist is watching the first program 112a, the values in the fifth column $P_{112b}$ represent a probability that a panelist is watching the second program 112b, and the value in the sixth column $P_{112c}$ represent a probability that a panelist is watching the third program 112c.

For example, referring to Table 1, the probability identifier 208 determines based on the first data stream 128 that Panelist A (e.g., the first panelist 104 of FIG. 1) is either not watching television with a 50% probability or watching the first program 112a with a 50% probability.

As another example, the probability identifier 208 determines based on, for example, the second data stream 130, that Panelist B (e.g., the second panelist 118 of FIG. 1) is watching television. However, the probability identifier 208 is unable to determine which program 112a, 112b, 112c Panelist B is watching based on the second data stream 130. Accordingly, the probability identifier 208 assigns equal probabilities to Panelist B with respect to the first, second, and third programs 112a, 112b, 112c. As another example, the probability identifier 208 can determine that Panelist E is watching the second program 112b based on a data stream received by the data collector 200 for Panelist E. Accordingly, the probability identifier 208 assigns Panelist E a probability of "1" based on the data indicating that Panelist E is watching the first program 112a. Thus, as disclosed above, the example probability identifier 208 analyzes the data streams (e.g., the data streams 128, 130) and assigns probabilities 209 with respect to viewing activity based on the data, including any uncertainties in the data.

The example viewing activity analyzer 132 of FIG. 2 includes a ratings calculator 210. The example ratings calculator 210 calculates one or more ratings 211 for one or more of the programs 112a, 112b, 112c based on the data in the data streams (e.g., the data streams 128, 130) in view of the probabilities 209 determined by the probability identifier 208 (e.g., as provided in Table 1). In the example of FIG. 2, the ratings calculator 210 also determines a null rating 211 representative of a percent of panelists not watching television (e.g., $F_0$). The example ratings calculator 210 of FIG. 2 employs a plurality of algorithms that account for the sampling weights 205 assigned to the respective panelists by the sampling weight assigner 204 and the probabilities 209 assigned by the probability identifier 208.

For example, the ratings calculator 210 can apply the following equations to determine the expected ratings 211 for the first, second, and third programs 112a, 112b, 112c and the percent of televisions not tuned to any of the programs 112a, 112b, 112c:

Where $p_{k,i}$ is a probability that the $k^{th}$ panelist is watching the $i^{th}$ program, $w_k$ is a sampling weight associated with the $k^{th}$ panelist, and n is the number of panelists, $$E[R_i] = \frac{\sum_{k=1}^{n} w_k p_{k,i}}{\sum_{k=1}^{n} w_k} \quad (1)$$

$$Var[R_i] = \frac{\sum_{k=1}^{n} w_k^2 (1 - p_{k,i}) p_{k,i}}{\left(\sum_{k=1}^{n} w_k\right)^2} \quad (2)$$

$$Cov[R_i, R_j] = -\frac{\sum_{k=1}^{n} w_k^2 p_{k,i} p_{k,j}}{\left(\sum_{k=1}^{n} w_k\right)^2} \quad (3)$$

Thus, expected ratings, variance, and covariance calculations are summed across the number of panelists n (e.g., the Panelists A-H of Table 1, above). In some examples, the ratings calculator 210 utilizes a normalized sampling weight or weighted average $v_k$ for the sampling weights 205 associated with the panelists, where $$v_k = \frac{w_k}{\sum_{k=1}^{n} w_k}.$$

Equations 1-3 above can be modified to include the normalized weight $v_k$ as follows:

$$E[R_i] = \sum_{k=1}^{n} v_k p_{k,i} \quad (4)$$

$$Var[R_i] = \sum_{k=1}^{n} v_k^2 (1 - p_{k,i}) p_{k,i} \quad (5)$$

$$Cov[R_i, R_j] = -\sum_{k=1}^{n} v_k^2 p_{k,i} p_{k,j} \quad (6)$$

In Equation (4), above, the expected ratings 211 for the $i^{th}$ program (e.g., one of programs 112a, 112b, 112c) are determined by summing the weighted average $v_k$ by the probability that the panelists (and, thus, the number of people each panelist represents) are watching the $i^{th}$ program.

In Equation (5), above, the variance calculation accounts for a probability that, for example, Panelist A (e.g., the first panelist 104 of FIG. 1) is not watching television and a probability that Panelist A is watching the $i^{th}$ program (e.g., the first program 112a). Thus, Equation (5) accounts for uncertainties in the first data stream 128 with respect to whether or not the first panelist 104 is watching the first program 112a (e.g., $p_{k,i}$) or is not watching television (e.g., $1-p_{k,i}$)) by considering both probabilities.

Equation (5) also considers the sampling weight 205 assigned to Panelist A (e.g., the first panelist 104) and, accordingly, a portion of the population represented by the Panelist A. For example, as indicated in example Table 1, above, the Panelist A is assigned a weight of ten. Thus, Panelist A represents ten individuals sharing, for example, a similar age demographic as Panelist A. As such, if there is a 20% probability that Panelist A is watching the first program 112a, then the ten people represented by the Panelist A are also considered to be watching the first program 112a with a probability of 20%. Thus, Equation (5) considers the probability that Panelist A is watching television and/or is watching one of the programs 112a, 112b, 112c as well as the portion of the population represented by the first panelist 104. In Equation (5), the variance is summed across the panelists to account for the fact that different panelists are associated with different probabilities of viewing a program and/or different probabilities with respect to not viewing television.

Referring to Table 1 above including the probabilities 209 of television viewership activity, the example ratings calculator 210 calculates the ratings 211 for the first program 112a, the second program 112b, and the third program 112c using Equations (1) or (4). The ratings calculator 210 also calculates a null rating 211 representing a percentage of panelists not watching television. For example, the ratings calculator 210 can calculate the following expected ratings 211 for $P_0$, $P_{112a}$, $P_{112b}$, $P_{112c}$ of Table 1 as follows:

$$E[R_i]=[0.1611\ 0.2855\ 0.3274\ 0.2259] \qquad (7)$$

Also, the example ratings calculator 210 can calculate a covariance matrix $\sigma^2(R_i,R_j)$ based on the variance equations (e.g., Equations (2) or (5)) and the covariance equations (e.g., Equations (3) or (6)) as follows:

$$\sigma^2(R_i R_j) = \begin{pmatrix} +0.0126 & -0.0047 & -0.0038 & -0.0042 \\ -0.0047 & +0.0253 & -0.0103 & -0.0103 \\ -0.0038 & -0.0103 & +0.0248 & -0.0108 \\ -0.0042 & -0.0103 & -0.0108 & +0.0253 \end{pmatrix} \qquad (8)$$

The covariance matrix (8) indicates relationships between, for example, the first program 112a and the other programs 112b, 112c. In the example covariance matrix (8), the diagonals of the matrix are computed by the ratings calculator 210 based on the variance (e.g., Equations (2) or (5)) and the off-diagonals of the matrix are computed based on the covariance (e.g., Equations (3) or (6)). In the example covariance matrix (8), the off-diagonals include negative values. The negative values of the off-diagonals in the covariance matrix (8) reflect the fact out of the potential viewing population, more people in the population who are watching one program (e.g., the first program 112a) means that less people in the population are able to watch the other programs (e.g., the second program 112b, the third program 112c). Also, the ratings calculator 210 considers the population that may not be watching television because that population is a part of the total potential viewing population. Thus, the example ratings calculator 210 of FIG. 2 calculates the ratings for the first, second, and third programs 112a, 112b, 112c based the probabilities that the panelists (and, thus, the portion of the population they represent) are viewing television or not viewing television.

The example viewing activity analyzer 132 of FIG. 2 includes a share calculator 212. The share calculator 212 determines share(s) 213, or a percentage of televisions that are in use that are tuned to a certain program. The shares computed by the example share calculator 212 are conditional based on the panelists (e.g., the panelists 104, 118 of FIG. 1) who are watching television. As disclosed above, there may be uncertainties with respect to whether a panelist such as the first panelist 104 and/or the second panelist 118 is watching television. Thus, the number of panelists who watching are television is a random variable. The shares calculator 212 considers the different panelists who may be watching television, as each panelist's sampling weight 205 may differ from another panelist.

The random variables with respect to the number of panelists who are watching television and the different sampling weights 205 associated each panelist can consume extensive resources of a processor (e.g., the processor 126 of FIG. 1) to calculate exact shares values. For example, to calculate the exact shares values, the shares calculator 212 would need to run multiple simulations considering all of the programs 112a-112n the panelists could be watching, with different panelists treated as watching different programs for each simulation. The multiple simulations consume resources of the processor 126, which can increase a time to perform the analysis and decrease efficiency. However, the shares calculator 212 of FIG. 2 increases the efficiency in determining the share(s) 213 by approximating the share(s) 213 as a conditional distribution of ratings. In the example of FIG. 2, the calculation of the share(s) 213 based on the conditional distribution of ratings converges to the exact shares values as the number of panelists considered increases. For a large panel size (e.g., thousands of panelists), the difference between the shares 213 calculated by the shares calculator 212 based on the conditional distribution and the exact shares values (e.g., calculated based on multiple simulations with the panelists watching different programs in each simulation) is substantially negligible.

The example shares calculator 212 of FIG. 2 determines a probability that a panelist is watching a particular program (e.g., the first, second, or third programs 112a, 112b, 112c), on the condition that the panelist is watching television. The shares calculator 212 calculates a share weight 215 for each panelist (e.g., the panelists 104, 118 of FIG. 1) based on a product of the sampling weight 205 assigned to the panelist and a probability that the panelist is not viewing television. The shares calculator 212 calculates a normalized share weight $z_k$ based on the sampling weights 205 (e.g., the sampling weights 205 in Table 1) as follows:

$$z_k = \frac{w_k(1 - p_{k,0})}{\sum_{k=1}^{n} w_k(1 - p_{k,0})} \qquad (9)$$

Equation (9) adjusts the respective sampling weights 205 assigned to the panelists based on the probabilities $p_{k,0}$ that the panelists are not watching television. The shares calculator 212 calculates a conditional share probability that if a panelist is watching television, then the panelist is watching the $i^{th}$ program, as follows:

$$s_{k,i} = \frac{p_{k,i}}{1 - p_{k,0}} \qquad (10)$$

In the example of FIG. 2, the shares calculator 212 generates a table including share weights 215 for each panelist in Table 1 (above) and conditional probabilities with respect to whether each panelist watching the first, second, or third programs 112a, 112b, 112c Table 2, below, is an example table generated by the shares calculator 212 based on Equations (9) and (10) for the panelists in Table 1:

TABLE 2

Conditional Share Probabilities

| Panelist | Age (e.g., demographics 114, 124) | Share Weights (215) | $S_1$ | $S_2$ | $S_3$ |
|---|---|---|---|---|---|
| A (e.g., panelist 104) | Young | 5 | 1 | 0 | 0 |
| B (e.g., panelist 118) | Young | 60 | .333 | .333 | .333 |
| C | Young | 0 | N/A | N/A | N/A |
| D | Middle | 72 | .222 | .333 | .444 |
| E | Middle | 40 | 0 | 1 | 0 |
| F | Middle | 70 | .3 | .5 | .2 |
| G | Old | 67.5 | .333 | .333 | .333 |
| H | Old | 18 | .5 | .333 | .166 |
| I | Old | 45 | .777 | 0 | .222 |

For example, in Table 1, above, Panelist C is assigned a sampling weight 205 of 20 by the example weight assigner 204 of FIG. 2 (e.g., based on demographics associated with Panelist C). However, Panelist C is also assigned a value of 1 with respect to $P_0$, indicating that Panelist C is not watching television. Accordingly, the example shares calculator 212 adjusts the sampling weight 205 assigned to Panelist C such that Panelist C has a share weight 215 of 0 because Panelist C is not watching television. As illustrated in example Table 2, because Panelist C is not watching television, Panelist C does not contribute to the calculation of the shares 213 for the first, second, and/or third programs 112a, 112b, 112c.

As another example, in Table 1, Panelist A is assigned a 50% probability of not watching television and a 50% probability of watching the first program 112a. Accordingly, the example shares calculator 212 adjusts the share weight 215 assigned to Panelist A in Table 2. Also, the example shares calculator 212 determines a conditional share probability indicating that if Panelist A is watching a program, then Panelist A is watching the first program 112a (e.g., as indicated by the value "1" for $S_1$).

As another example, Table 1 indicates that there is a 10% probability that Panelist D is not watching television. Thus, there is a 90% probability that Panelist D is watching television. The example shares calculator 212 of FIG. 2 adjusts the sampling weight 205 (e.g., 80) assigned to Panelist D to obtain the share weight 215 for Panelist D (e.g., 80*0.9=72). Thus, although for ratings purposes, Panelist D represents 80 people, for purposes of determining shares, Panelist D represents 72 people. As also indicated in Table 1, there is a 20% probability that Panelist D is watching the first program 112a, a 30% probability of watching the second program 112b, and a 40% probability of watching the third program 112c, and, thus, a 90% probability that Panelist D is watching one of the programs 112a, 112b, 112c. The shares calculator 212 calculates, for example, a conditional share probability $S_1$ that Panelist D is watching the first program 112a based on the probability that Panelist D is watching the first program from Table 1 (e.g., 0.2/0.9=0.222). The shares calculator 212 calculates a conditional share probability $S_2$ that Panelist D is watching the second program 112b (e.g., 0.3/0.9=0.333) and a conditional share probability $S_3$ that Panelist D is watching the third program 112b (e.g., 0.4/0.9=0.444). Thus, the conditional share probabilities $S_1$, $S_2$, $S_3$ in Table 2 are based on the condition that a panelist is viewing television.

The examples shares calculator 212 of FIG. 2 computes the expected shares for the ith program (e.g., first, second, and/or third programs 112a, 112b, 112c), the variance, and covariance based on the data in example Table 2 as follows:

$$E[S_i]=\Sigma_{k=1}^{n} z_k s_{k,i} \quad (11)$$

$$Var[S_i]=\Sigma_{k=1}^{n} z_k^2 (1-s_{k,i}) s_{k,i} \quad (12)$$

$$Cov[R_i,R_j]=-\Sigma_{k=1}^{n} z_k^2 s_{k,i} s_{k,j} \quad (13)$$

In some examples, if the ratings for the ith program (e.g., first, second, and/or third programs 112a, 112b, 112c) have been calculated (e.g., as disclosed above with respect to Equations (1) or (4)), the shares calculator 212 calculates the expected shares as follows:

$$E[S_i] = \frac{E[R_i]}{1 - E[R_0]} \quad (14)$$

The expected shares $E[S_i]$ computed by the example shares calculator 212 represents the condition probability that given that the panelist is watching television, then the panelist and, thus, the persons the panelist represents, is watching the ith program (e.g., first, second, or third programs 112a, 112b, 112c).

Referring to Table 2 above including the probabilities of viewership activity with respect to the first, second, and/or third programs 112a, 112b, 112c, the example shares calculator 212 calculates the expected shares 213 for the first program 112a, the second program 112b, and the third program 112c using Equations (11) or (14). For example, the shares calculator 212 can calculate the following expected shares 213 for first, second, and/or third programs 112a, 112b, 112c as follows:

$$E[S_i]=[0.3404 \ 0.3907 \ 0.2689] \quad (15)$$

Also, the example shares calculator 212 can calculate a covariance matrix $\sigma^2(S_i, S_j)$ based on the variance (e.g., Equation (12)) and the covariance (e.g., Equation (13)) for Table 2 as follows:

$$\sigma^2(S_i S_j) = \begin{pmatrix} 0.0293 & -0.0146 & -0.0147 \\ -0.0146 & 0.0299 & -0.0153 \\ -0.0147 & -0.0153 & 0.0300 \end{pmatrix} \quad (16)$$

The covariance matrix (16) indicates relationships between, for example, the first program 112a and the other programs 112b, 112c. In the example covariance matrix (16), the diagonals of the matrix (16) are computed by the shares calculator 212 based on the variance (e.g., Equation (12)) and the off-diagonals of the matrix are computed based on the covariance (e.g., Equation (13)). In the example covariance matrix (16), the off-diagonals include negative values. The negative values of the off-diagonals in the covariance matrix (16) reflect the fact out of the population who is viewing television, more people in the population who are watching one program (e.g., the first program 112a) means that less people in the population are watching the other programs (e.g., the second program 112b, the third program 112c). Thus, the example shares calculator 212 of FIG. 2 calculates the shares for the first, second, and third programs 112a, 112b, 112c based the probabilities that the panelists (and, thus, the population the panelists represent) are viewing the television and viewing certain programs.

Thus, the ratings calculator 210 and the shares calculator 212 of the example viewing activity analyzer 132 of FIG. 2 determines ratings and/or shares for one or more of the programs 112a-112n that may be viewed by panelist, such as the first panelist 104 and/or the second panelist 118 of FIG. 1. As disclosed above, each of the panelists 104, 118 is associated with respective demographics 114, 124. The example viewing activity analyzer 132 of FIG. 2 can also calculate the ratings and/or shares for the program(s) 112a-112n based on a subgroup of interest, such as a subgroup associated with a particular demographic (e.g., age, gender).

The example viewing activity analyzer of FIG. 2 includes a subgroup analyzer 214. In some examples, a user of the example processor 126 of FIG. 1 can request that the ratings calculator 210 of the viewing activity analyzer 132 calculate ratings 211 for one or more of the programs 112a-112n for a particular demographic group (e.g., by providing a user input to the processor 126). Additionally or alternatively, the user can request that the shares calculator 212 calculate shares 213 for one or more of the programs 112a-112n for a particular demographic group. The example subgroup analyzer 214 identifies the relevant demographics 114, 124 of the data streams 128, 130 stored in the example database 202 of the viewing activity analyzer 132. The subgroup analyzer 214 provides the relevant demographic data to the ratings calculator 210 and/or the shares calculator 212.

For example, referring to Table 1 above, a user may be interested in ratings 211 and shares 213 for one or more of the programs 112a-112n for just the "young" demographic group. Based on a user input received by the processor 126 directing the viewing activity analyzer 132 to determine the ratings for the "young" demographic group, the example subgroup analyzer 214 identifies the relevant data streams 128, 130 stored in the database 202 corresponding to the demographic group of interest. For example, with respect to the "young" demographic group, the subgroup analyzer 214 identifies the viewing data associated with Panelist A (e.g., the first panelist 104), Panelist B (e.g., the second panelist 118), and Panelist C based on their association with the demographic group of interest. In some examples, the subgroup analyzer 214 scans the data stored in the database 202 to identify the relevant panelist viewing data based on, for example, tags associated with the data stream 128, 130 stored in the database 202.

The example subgroup analyzer 214 provides the relevant viewing data for the demographic group of interest to the ratings calculator 210 and the shares calculator 212. The example ratings calculator 210 of FIG. 2 applies one or more of Equations (1)-(6) above to determine the expected rating(s) 211 for the programs(s) 112a-112n for the selected demographic group. For example, the ratings calculator 210 performs the summations for only the demographic group of interest (e.g., $E[R_i]=\Sigma_{k=1}^{n} v_k p_{k,i}$, where n is the number of panelists in the "young" demographic group). In some examples, the ratings calculator 210 determines normalized weights (e.g., the weight $v_k$) for the demographic group of interest based on the sampling weights 205 assigned to the panelists associated with the demographic group of interest. The rating calculator 210 uses the normalized weights to calculate the expected ratings, variance, and/or covariance for the demographic group of interest.

Similarly, the example shares calculator 212 of FIG. 2 calculates the share(s) 213 for the program(s) 112a-112n using the normalized weights for the demographic group of interest and by summing across the number of panelists in the demographic group of interest to calculate the expected share(s) 213, variance, and/or covariance (e.g., using Equations (9)-(14)). Thus, the example viewing activity analyzer 132 can determine expected ratings and/or shares and respective variance and covariance of the ratings and/or shares for a subgroup of interest.

The example subgroup analyzer 214 can also determine one or more subgroup viewing metrics 217. For example, the subgroup analyzer 214 can determine a probability that a person within a demographic group of interest is watching a particular program 112a-112n (e.g. in response to user input received by the processor 126). For example, a user may be interested in a probability that a person in the "middle" demographic age group of Table 1 is watching the one of the programs 112a, 112b, 112c. In such examples, the example subgroup analyzer 214 of FIG. 2 identifies Panelists D, E, and F as associated with the "middle" age group and generates a vector K including viewing data for Panelists D, E, and F from the respective data streams stored in the database 202. For example, based on the data in the vector K, the subgroup analyzer 214 can determine the probability that any person within the "middle" age group is watching $i^{th}$ program as follows:

Prob[K∈ith program]=1-$\Pi_{k \in K}(1-p_{k,i})$ (17), where Prob [K∈ith program] is the probabitlity at least one person in the subgroup of interest is watching the $i^{th}$ program and $(1-p_{k,i})$ is the probability a person in the subgroup is not watching the $i^{th}$ program.

Thus, Equation (17) calculates a product over members of the selected subgroup with respect to the subgroup members watching a program of interest.

For example, referring to Table 1, the probability identifier 208 identified a 20% probability that Panelist D is watching the first program 112a, a 0% probability that Panelist E is watching the first program 112a, and a 30% probability that Panelist F is watching the first program 112a. The subgroup analyzer 214 can determine the probability that one of Panelists D, E, or F are watching the first program 112a as follows:

$$\text{Prob["Middle" age group watching first program]} \\ =1-(1-0.2)(1-0)(1-0.3)=0.44 \quad (18)$$

Thus, the subgroup analyzer 214 determines that there is a 44% probability that a panelist (and, thus, the persons the panelist(s) represent) in the "middle" age demographic is watching the first program 112a. Also, subgroup analyzer 214 can determine the variance as follows:

$$\text{Var}[X]=(\Pi_{k \in K}(1-p_{k,i}))(1-\Pi_{k \in K}(1-p_{k,i})) \quad (19)$$

The example subgroup analyzer 214 of FIG. 2 can also determine for a given program 112a-112n, a percentage of people watching the program who are associated with a certain demographic. In the example of FIG. 2, data regarding the number of panelists in a demographic who are viewing the program 112a-112n of interest and the number of total people viewing the program 112a-112n of interest are random variables. The subgroup analyzer 214 analyzes different probabilistic combinations of groups of panelists (e.g., the panelists in Table 1) who are watching the program 112a-112n of interest and the respective sampling weights 205 assigned to the panelists. In some examples, the subgroup analyzer 214 approximates the percentage of panelists in a demographic group of interest who are watching the program 112a-112n of interest based on a large panel size (e.g., thousands of panelists). For example, for a group of K people, the subgroup analyzer 214 can approximate a proportion of panelists watching program i that belong to the group K as follows:

$$p_{\{K\}} = \frac{\sum_{k \in K} w_k p_{k,i}}{\sum_{k=1}^{n} w_k p_{k,i}} \quad (20)$$

In Equation (20), above, the numerator represents the subgroup of interest and the denominator considers all panelists viewing the program of interest (e.g., all demographics). The subgroup analyzer 214 can determine the variance and covariance as follows:

$$\text{Var}[p_{\{K\},i}] = \frac{\sum_{k \in K} w_k^2 (1 - p_{k,i}) p_{k,i}}{\left(\sum_{k=1}^{n} w_k p_{k,i}\right)^2} \quad (21)$$

$$\text{Cov}[p_{\{K\},i}, p_{\{K\},j}] = -\frac{\sum_{k \in K} w_k^2 p_{k,i}, p_{k,j}}{\left(\sum_{k=1}^{n} w_k p_{k,i}\right)\left(\sum_{k=1}^{n} w_k p_{k,j}\right)} \quad (22)$$

The covariance determined by Equation (22) can be used to analyze viewing activity for different programs 112a-112n across the subgroup of interest. For example, the covariance can be analyzed with respect to a proportion of viewers belonging to a subgroup across two different programs 112a-112n.

The example viewing activity analyzer 132 can calculate the ratings 211, the shares 213, and/or the subgroup viewing metrics 217 at the household level in addition or as an alternative to determining viewing metrics at the panelist level or demographic group level. For example, the sampling weight assigner 204 can assign sampling weights 205 to the first household 102 and/or the second household 116 based on, for example, household size. Based on a user request to calculate, for example, ratings 211 and/or shares 213 at the household level, the subgroup analyzer 214 can identify and/or format the viewing data of the data streams 128, 130 by household. As an example, the ratings calculator 210 can determine the ratings 211 based on a probability that any member of the household (e.g., the first household 102) is watching television.

Thus, the example viewing activity analyzer 132 can determine different viewing activity metrics such as ratings 211 and/or shares 213 despite probabilities or uncertainties in the data streams (e.g., the data streams 128, 130 of FIG. 1) received from the panel meters (e.g., the meters 108, 122). The example viewing activity analyzer 132 can also determine subgroup-specific metrics, including, for example, what program(s) a demographic group is watching and/or what demographic group is watching a certain program. The example viewing activity analyzer 132 includes a communicator 216. The communicator 216 outputs one or more of the ratings 211, shares 213, or subgroup metrics (e.g., the viewing metric output(s) 134 of FIG. 1) for display via, for example, the output device 136.

While an example manner of implementing the viewing activity analyzer 132 is illustrated in FIGS. 1-2, one or more of the elements, processes and/or devices illustrated in FIGS. 1-2 may be combined, divided, re-arranged, omitted, eliminated and/or implemented in any other way. Further, the example data collector 200, the example database 202, the example sampling weight assigner 204, the example probability identifier 208, the example ratings calculator 210, the example shares calculator 212, the example subgroup analyzer 214, the example communicator 216 and/or, more generally, the example viewing activity analyzer of FIGS. 1-2 may be implemented by hardware, software, firmware and/or any combination of hardware, software and/or firmware. Thus, for example, any of the example data collector 200, the example database 202, the example sampling weight assigner 204, the example probability identifier 208, the example ratings calculator 210, the example shares calculator 212, the example subgroup analyzer 214, the example communicator 216 and/or, more generally, the example viewing activity analyzer of FIGS. 1-2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data collector 200, the example database 202, the example sampling weight assigner 204, the example probability identifier 208, the example ratings calculator 210, the example shares calculator 212, the example subgroup analyzer 214, the example communicator 216 and/or, more generally, the example viewing activity analyzer of FIGS. 1-2 is/are hereby expressly defined to include a tangible computer readable storage device or storage disk such as a memory, a digital versatile disk (DVD), a compact disk (CD), a Blu-ray disk, etc. storing the software and/or firmware. Further still, the example data collector 200, the example database 202, the example sampling weight assigner 204, the example probability identifier 208, the example ratings calculator 210, the example shares calculator 212, the example subgroup analyzer 214, the example communicator 216 and/or, more generally, the example viewing activity analyzer of FIGS. 1-2 may include one or more elements, processes and/or devices in addition to, or instead of, those illustrated in FIGS. 1-2, and/or may include more than one of any or all of the illustrated elements, processes and devices.

Figure 3:
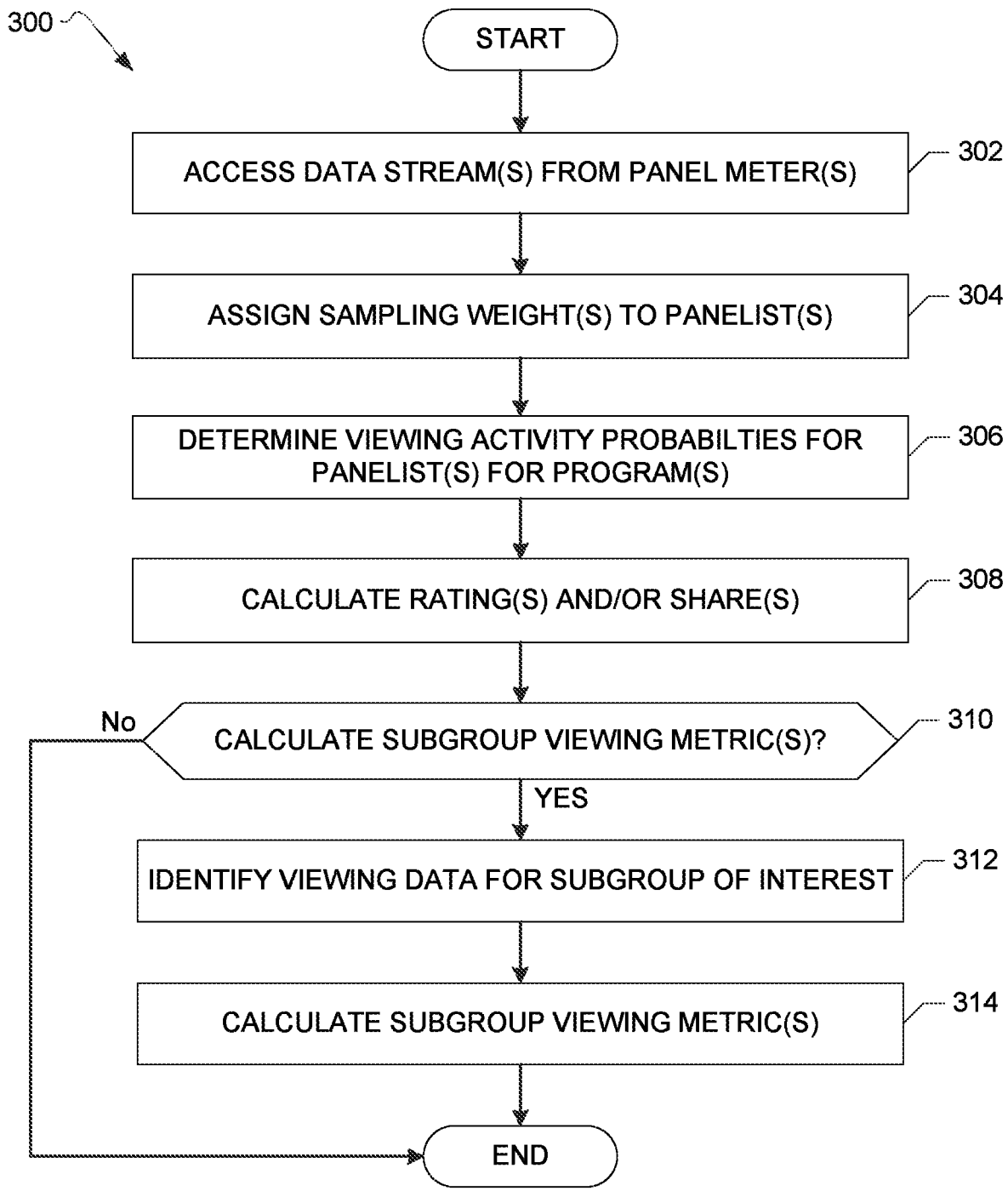
FIG. 3 is a flowchart representative of example machine readable instructions that may be executed to implement the example system of FIGS. 1-2.

A flowchart representative of example machine readable instructions for implementing the example viewing activity analyzer 132 of FIGS. 1-2 is shown in FIG. 3. In this example, the machine readable instructions comprise a program for execution by a processor such as the processor 126 of FIG. 1 and shown in the example processor platform 400 discussed below in connection with FIG. 4. The program may be embodied in software stored on a tangible computer readable storage medium such as a CD-ROM, a floppy disk, a hard drive, a digital versatile disk (DVD), a Blu-ray disk, or a memory associated with the processor 126, but the entire program and/or parts thereof could alternatively be executed by a device other than the processor 126 and/or embodied in firmware or dedicated hardware. Further, although the example program is described with reference to the flowchart illustrated in FIG. 3, many other methods of implementing the example viewing activity analyzer 132 of FIGS. 1-2 may alternatively be used. For example, the order of execution of the blocks may be changed, and/or some of the blocks described may be changed, eliminated, or combined.

As mentioned above, the example process of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 300 of FIG. 3 begins at block 302 with the data collector 200 of the example viewing activity analyzer 132 of FIG. 2 accessing one or more data streams such as the first data stream 128 and/or the second data stream 130 of FIG. 1 from the panel meter(s) 108, 122 associated with televisions 106, 120 in one or more households 102, 116 (block 302). The data stream(s) 128, 132 include television viewing data with respect to, for example, a program 112a-112n broadcast by the television(s) 106, 120 and viewed by the panelists 104, 118. The data can be stored in the example database 202 of the example viewing activity analyzer of FIG. 2.

The program of FIG. 3 includes the example sampling weight assigner 204 of FIG. 2 assigning sampling weight(s) 205 to the panelist(s) 104, 118 (block 304). The sampling weight assigner 204 can assign the sampling weight(s) 205 based on, for example, one or more demographics 114, 124 associated with the panelist(s) 104, 118, such as age and/or gender. In some examples, the sampling weight assigner 204 assigns sampling weight(s) 205 to the household(s) 102, 116 from which the data stream(s) 218, 130 are received based on, for example, household size. The sampling weight assigner 204 can assign the sampling weight(s) 205 based on one or more sampling weight rule(s) 206 stored in the example database 202 of the viewing activity analyzer 132 of FIG. 2.

The program of FIG. 3 includes the probability identifier 208 determining viewing probabilities 209 for, for example, the panelist(s) 104, 116 associated with data stream(s) 128, 130 (block 306). The probability identifier 208 identifies uncertainties in the data stream(s) 128, 130 with respect to, for example, whether a panelist is watching television, what program 112a-112n the panelist is watching, etc. In some examples, the uncertainties are due to, for example, potential co-viewing activity between two or more members of a household. In other examples, the uncertainties are due to, for example, a technical error in the collection of the viewing data by the panel meter(s) 108, 122. The probability identifier 208 can determine the viewing probabilities 209 with respect to whether or not a panelist watched television and/or what program(s) 112a-112n the panelist could have watched based on one or more probability rule(s) 207 stored in the example database 202 of FIG. 2. In some examples, the probability identifier 208 identifies the probabilities 209 with respect to, for example, whether or not any member of a household is watching television.

The program of FIG. 3 includes the example ratings calculator 210 of FIG. 2 calculating expected ratings 211 for one or more programs 112a-112n (block 308). In some examples, the ratings calculator 210 uses one or more algorithms to calculate the ratings 211, such as Equations (1) or (4) disclosed above. In determining the ratings 211, the ratings calculator 210 accounts for the probabilities 209 with respect to whether or not the panelist(s) 104, 118 are watching television, what program(s) 112a-112n the panelist(s) 104, 118 are watching, etc. In some examples, the ratings calculator 210 calculates the variance (e.g., using Equations (2), (5)) and/or covariance (e.g., using Equations (3), (6)) with respect to program viewing activity to analyze viewership behavior between, for example, two or more programs 112a-112n (e.g., as reflected in the example covariance matrix (8)). In some examples, the ratings calculator 210 calculates a null rating 211 indicative of a percentage of panelists who are not watching any program.

In some examples of the program of FIG. 3, the shares calculator 212 of FIG. 2 additionally or alternatively calculates the expected share(s) 213 for the program(s) 112a-112n (e.g., using Equation (11) disclosed above) (block 308). For example, to calculate the share(s) 213, the example shares calculator 212 adjusts the sampling weight(s) 205 assigned to the panelist(s) 104, 118 to determine share weight(s) 215 representative of television viewing behavior by the panelist(s) 104, 118 (e.g., based on probabilities 209 indicating that the panelist(s) 104, 118 may or may not be watching television). The example shares calculator 212 calculates the shares 213 based on the share weights 215 and conditional probabilities that the panelist(s) are watching a particular program 112a-112n, if the panelist(s) are watching television (e.g., determined based on the probabilities 209 with respect to program viewing probabilities). In some examples, the shares calculator 212 calculates the variance (e.g., using Equation (12)) and/or covariance (e.g., using Equation (13)) with respect to program viewing activity to analyze viewing activity between, for example, two or more programs 112a-112n (e.g., as reflected in the example covariance matrix (16)).

The example of FIG. 3 includes a determination as to whether the example subgroup analyzer 214 of FIG. 2 is to calculate one or more subgroup viewing metrics 217 (block 310). In some examples, the subgroup analyzer 214 calculates the subgroup viewing metric(s) 217 based on one or more user inputs received via the processor 126 of FIG. 1 that instructs viewing metrics such as ratings 211 and/or shares 213 to be calculated for one or more demographic groups of interest (e.g., an age group, an ethnic group, a gender group).

The subgroup analyzer 214 identifies viewing data for the subgroup of interest based on the data streams 128, 130 stored in the database 202 of FIG. 2 (block 312). In some examples, the subgroup analyzer 214 identifies the relevant viewing data for panelists in the subgroup of interest (e.g., the panelists 104, 118 of FIG. 1) based on one or more tags identify the demographics 114, 124 associated with the panelists.

The example of FIG. 3 includes calculating the one or more subgroup viewing metrics 217 (block 314). In some examples, the subgroup analyzer 214 instructs the ratings calculator 210 to calculate ratings 211 for one or more programs 112a-112n for the subgroup of interest. In some examples, the subgroup analyzer 214 instructs the shares calculator 212 to calculate shares 213 for one or more programs 112a-112n for the subgroup of interest. In such examples, the ratings calculator 210 calculates the ratings 211 (and, in some examples, the variance and covariance) substantially as disclosed above (e.g., at block 308) for the subgroup of interest. Also in some such examples, the shares calculator 212 calculates the shares 213 and, in some examples, the variance and covariance) substantially as disclosed above (e.g., at block 308) for the subgroup of interest.

In some examples, the subgroup analyzer 214 calculates subgroup viewing metrics 217 with respect to, for example, a probability that a subgroup of interest is watching one or more of the programs 112a-112n. For example, the subgroup analyzer 214 uses Equation (17), disclosed above, to determine a probability that any person within a demographic group of interest is watching one of the programs 112a-112n. In some examples, the subgroup analyzer 214 determines a subgroup that is watching a particular program 112a-112n. For example, the subgroup analyzer 214 uses Equation (20), disclosed above, to approximate a proportion of panelists watching one of the programs 112a-112n that belong to a subgroup of interest (e.g., a demographic group of interest).

If a decision is made not to calculate viewing metrics for a subgroup (e.g., at block 310), the example program 300 ends. Also, if there are no further subgroup viewing metrics 217 to calculate (e.g., based on user input(s) received at the processor 126), the example program 300 ends.

Figure 4:
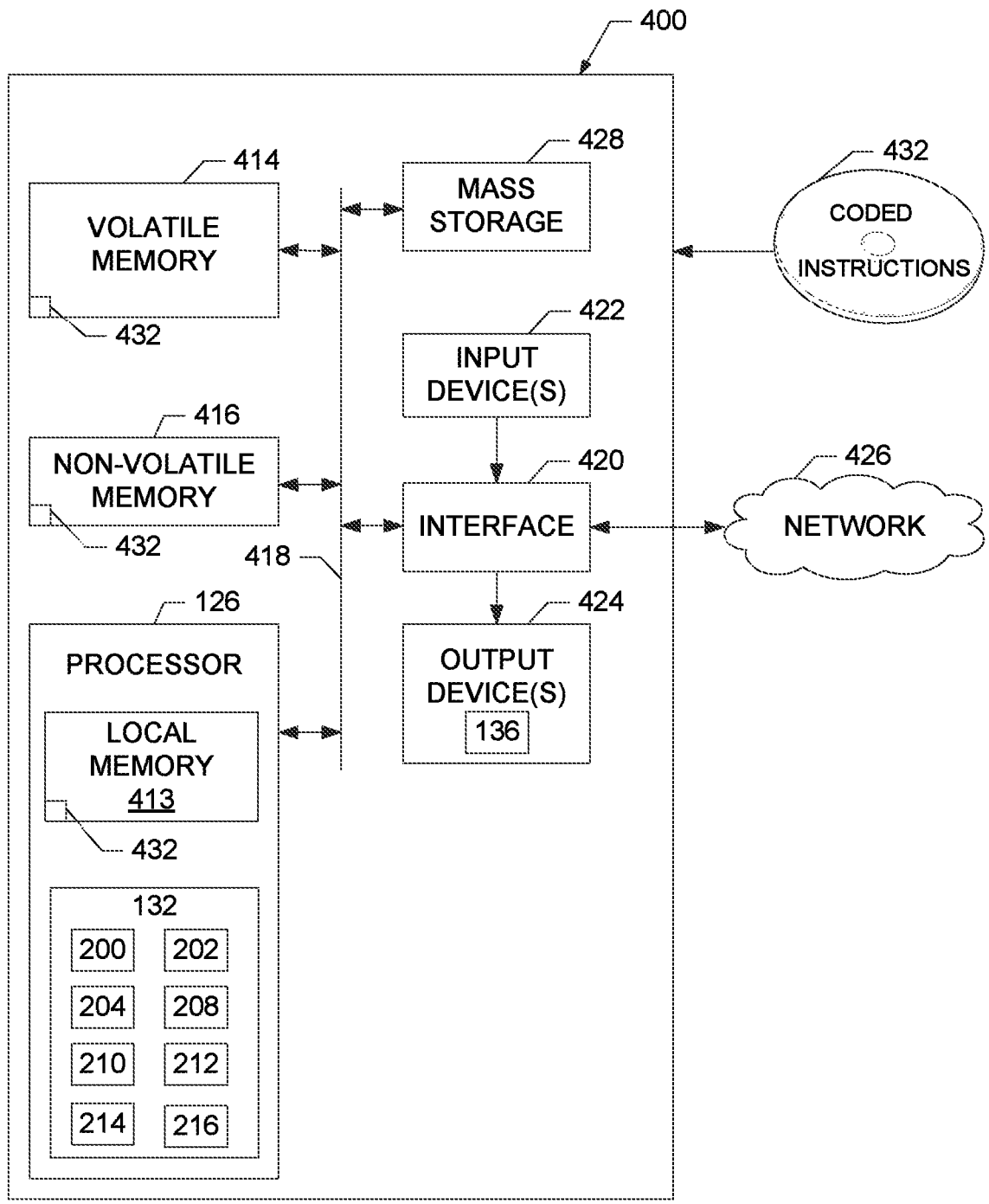
FIG. 4 illustrates an example processor platform that may execute the example instructions of FIG. 3 to implement the example system of FIGS. 1-2.

FIG. 4 is a block diagram of an example processor platform 400 capable of executing the instructions of FIG. 3 to implement the data collector 200, the example database 202, the example sampling weight assigner 204, the example probability identifier 208, the example ratings calculator 210, the example shares calculator 212, the example subgroup analyzer 214, the example communicator 216 and/or, more generally, the example viewing activity analyzer of FIGS. 1-2. The processor platform 400 can be, for example, a server, a personal computer, a mobile device (e.g., a cell phone, a smart phone, a tablet such as an iPad™), a personal digital assistant (PDA), an Internet appliance, a set top box, or any other type of computing device.

The processor platform 400 of the illustrated example includes the processor 126. The processor 126 of the illustrated example is hardware. For example, the processor 126 can be implemented by one or more integrated circuits, logic circuits, microprocessors or controllers from any desired family or manufacturer.

The processor 126 of the illustrated example includes a local memory 413 (e.g., a cache). The processor 126 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 126. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 136, 424 are also connected to the interface circuit 420 of the illustrated example. The output devices 136, 424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives.

Coded instructions 432 to implement the instructions of FIG. 3 may be stored in the mass storage device 428, in the volatile memory 1014, in the non-volatile memory 416, and/or on a removable tangible computer readable storage medium such as a CD or DVD.

From the foregoing, it will be appreciated that the above disclosed systems, methods, and apparatus improves the ability to determine viewing metrics such as ratings and/or shares for media such as one or more television programs in view of uncertainties or probabilities in the data from which the viewing metrics are calculated. Examples disclosed herein determines the viewing metrics by accounting for different scenarios with respect to whether a panelist is watching television, what program he or she is watching, etc. and the probabilities that such scenarios will happen. Examples disclosed herein compute expected ratings and/or expected shares and respective variance or covariance thereof despite the probabilities in the viewing data. Thus, examples disclosed herein compute ratings and/or shares that more accurately reflect viewer behavior as compared to ratings and/or shares calculated based on the randomly assigned probability data (e.g., the 0's and 1's).

Examples disclosed herein increase efficiency and reduce processor resources in determining the ratings and/or shares based on the probabilistic data as compared to, for example, repeating probabilistic stimulations thousands of times, by approximating expected ratings and/or shares. Some disclosed examples provide for calculation of subgroup-specific metrics. Disclosed examples provide accurate and efficient analyses of viewing behavior despite uncertainties or probabilities in the viewing data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for determining a viewing metric for media to be viewed by a plurality of panelists, the apparatus comprising:
   a probability identifier to identify a probability for respective ones of the panelists with respect to the panelists viewing the media, the probability identifier to identify the probability based on viewing data for the respective ones of the panelists, the viewing data including incomplete viewing data for one or more of the panelists relative to the media; and
   a calculator to:
      calculate a conditional probability for the respective ones of the panelists based on the probability for the respective ones of the panelists, the conditional probability based on a condition of the respective ones of the panelists viewing respective media presentative devices during a first time period associated with a presentation of the media;
      calculate a share weight for the respective ones of the panelists based on a sampling weight assigned to the respective ones of the panelists and a probability of the respective ones of the panelists not viewing the respective media presentation devices during the first time period; and
      approximate a share indicative of viewership of the media using a conditional distribution based on the conditional probability and the share weight calculated for the respective ones of the panelists.

2. The apparatus of claim 1, wherein the media is first media, the probability is a first probability for the respective ones of the panelists, the share is a first share, and the probability identifier is to identify a second probability for the respective ones of the panelists with respect to the panelists viewing second media, the calculator to:
   calculate a second share for the second media; and
   determine a covariance between the first media and the second media based on the first share and the second share.

3. The apparatus of claim 1, wherein the calculator is to calculate a rating for the media.

4. The apparatus of claim 1, further including a subgroup analyzer, the subgroup analyzer to identify the respective probabilities for a subgroup including one or more of the panelists with respect to the panelists of the subgroup viewing the media based on one or more demographics of the respective panelists.

5. The apparatus of claim 4, wherein the subgroup analyzer is to determine a probability of the subgroup viewing the media based on the probabilities identified for the subgroup.

6. The apparatus of claim 4, wherein the subgroup analyzer is to determine a portion of the panelists viewing the media who are associated with the subgroup based on the probabilities identified for the subgroup and the probabilities identified for all of the panelists.

7. The apparatus of claim 1, wherein the sampling weight is based on demographic data for the panelists.

8. The apparatus of claim 1, wherein the media is first media and the calculator is to calculate the conditional probability by calculating a first conditional probability that the respective ones of the panelists are viewing the first media and a second conditional probability that the respective ones of the panelists are viewing a second media during the first time period.

9. A method for determining a viewing metric for media to be viewed by a plurality of panelists, the method comprising:
   identifying, by executing an instruction with a processor, a probability for respective ones of the panelists with respect to the panelists viewing the media, the identifying based on viewing data for the respective ones of the panelists, the viewing data including incomplete viewing data for one or more of the panelists relative to the media;
   calculating, by executing an instruction with the processor, a conditional probability for the respective ones of the panelists based on the probability for the respective ones of the panelists, the conditional probability based on a condition of the respective ones of the panelists viewing respective media presentative devices during a first time period associated with a presentation of the media;
   calculating, by executing an instruction with the processor, a share weight for the respective ones of the panelists based on a sampling weight assigned to the respective ones of the panelists and a probability of the respective ones of the panelists not viewing the respective media presentation devices during the first time period; and
   approximating, by executing an instruction with the processor, a share indicative of viewership of the media using a conditional distribution based on the conditional probability and the share weight calculated for the respective ones of the panelists.

10. The method of claim 9, wherein the media is first media, the probability is a first probability for the respective ones of the panelists, the share is a first share, and further including:
    identifying a second probability for the respective ones of the panelists with respect to the panelists viewing second media;
    calculating a second share for the second media; and
    determining a covariance between the first media and the second media based on the first share and the second share.

11. The method of claim 9, further including calculating a rating for the media.

12. The method of claim 9, further including identifying the respective probabilities for a subgroup including one or more of the panelists with respect to the panelists of the subgroup viewing the media based on one or more demographics of the respective panelists.

13. The method of claim 12, further including determining a probability of the subgroup viewing the media based on the probabilities identified for the subgroup.

14. The method of claim 12, further including determining a portion of the panelists viewing the media who are associated with the subgroup based on the probabilities identified for the subgroup and the probabilities identified for all of the panelists.

15. A non-transitory computer-readable medium comprising instructions that, when executed, cause a processor to at least: identify a probability for respective ones of panelists with respect to the panelists viewing a media, the processor to identify the probability based on viewing data for the respective ones of the panelists, the viewing data including incomplete viewing data for one or more of the panelists relative to the media; calculate a conditional probability for the respective ones of the panelists based on the probability for the respective ones of the panelists, the conditional probability based on a condition of the respective ones of the panelists viewing respective media presentative devices during a first time period associated with a presentation of the media; calculate a share weight for the respective ones of the panelists, based on a sampling weight assigned to the respective ones of the panelists and a probability of the respective ones of the panelists not viewing the respective media presentation devices during the first time period; and approximate a share indicative of viewership of the media using a conditional distribution based on the conditional probability and the share weight calculated for the respective ones of the panelists.

16. The non-transitory computer-readable medium of claim 15, wherein the media is first media, the probability is a first probability for the respective ones of the panelists, the share is a first share, and the instructions further cause the processor to: identify a second probability for the respective ones of the panelists with respect to the panelists viewing second media; calculate a second share for the second media; and determine a covariance between the first media and the second media based on the first share and the second share.

17. The non-transitory computer-readable medium of claim 15, where the in further cause the processor to identify the respective probabilities for a subgroup including one or more of the panelists with respect to the panelists of the subgroup viewing the media based on one or more demographics of the respective panelists.

18. The non-transitory computer-readable medium of claim 17, wherein the instructions Further cause the processor to determine a probability of the subgroup viewing the media based on the probabilities identified for the subgroup.

19. The non-transitory computer-readable medium of claim 17, wherein the instructions further cause the processor to determine a portion of the panelists viewing the media who are associated with the subgroup based on the probabilities identified for the subgroup and the probabilities identified for all of the panelists.

* * * * *

UNITED STATES PATENT AND TRADEMARK OFFICE
CERTIFICATE OF CORRECTION

PATENT NO. : 10,791,355 B2
APPLICATION NO. : 15/385508
DATED : September 29, 2020
INVENTOR(S) : Sheppard et al.

Page 1 of 1

It is certified that error appears in the above-identified patent and that said Letters Patent is hereby corrected as shown below:

In the Claims

Claim 17, Column 24, Line 6:
Replace "in" with --instructions--.

Claim 18, Column 24, Line 12:
Replace "Further" with --further--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*